(12) United States Patent
Lu et al.

(10) Patent No.: US 8,776,103 B2
(45) Date of Patent: *Jul. 8, 2014

(54) INTERACTIVE SERVICE DEVICE METERING SYSTEMS

(75) Inventors: Daozheng Lu, Dunedin, FL (US); David H. Harkness, Wilton, CT (US); Manish Bhatia, Secaucus, NJ (US); Jerome Samson, Belleair Beach, FL (US); William A. Feininger, Palm Harbor, FL (US)

(73) Assignee: The Nielsen Company (US), LLC, Schaumburg, IL (US)

( * ) Notice: Subject to any disclaimer, the term of this patent is extended or adjusted under 35 U.S.C. 154(b) by 1096 days.

This patent is subject to a terminal disclaimer.

(21) Appl. No.: 12/631,538

(22) Filed: Dec. 4, 2009

(65) Prior Publication Data

US 2010/0138770 A1    Jun. 3, 2010

Related U.S. Application Data

(60) Continuation of application No. 10/284,409, filed on Oct. 31, 2002, now Pat. No. 7,644,422, which is a division of application No. 08/763,750, filed on Dec. 11, 1996, now Pat. No. 7,607,147.

(51) Int. Cl.
| | |
|---|---|
| *H04N 7/173* | (2011.01) |
| *G06F 13/00* | (2006.01) |
| *H04N 7/10* | (2006.01) |
| *G06F 17/00* | (2006.01) |
| *H04L 9/32* | (2006.01) |

(52) U.S. Cl.
USPC .................... 725/14; 725/9; 725/20; 709/224

(58) Field of Classification Search
USPC .................. 725/9–21, 45–46; 709/224; 705/5
See application file for complete search history.

(56) References Cited

U.S. PATENT DOCUMENTS

| | | | |
|---|---|---|---|
| 3,484,787 | A | 12/1969 | Vallese |
| 3,540,003 | A | 11/1970 | Murphy |

(Continued)

FOREIGN PATENT DOCUMENTS

| | | |
|---|---|---|
| CA | 1318967 | 6/1993 |
| CA | 2353303 | 1/2003 |

(Continued)

OTHER PUBLICATIONS

National Institute of Industrial Property, Official Gazette, issued for Brazil Patent Application No. PI 9713896-7, on Jun. 25, 2013, 1 page.

(Continued)

*Primary Examiner* — Pankaj Kumar
*Assistant Examiner* — Reuben M Brown
(74) *Attorney, Agent, or Firm* — Hanley, Flight & Zimmerman, LLC

(57) ABSTRACT

A metering system meters usage of on-line and local services by way of interactive service devices. An example metering system includes a first data acquisition module configured to copy usage data associated with a first interactive service device and a second data acquisition module configured to copy usage data associated with a second interactive service device different than the first interactive service device. Each of the data acquisition modules is configured to distinguish between on-line communications associated with access to an on-line service and local communications associated with a local application program. In addition, each data acquisition module is configured to extract the usage data based whether an on-line communication or a local communication is identified.

75 Claims, 11 Drawing Sheets

(56) References Cited

U.S. PATENT DOCUMENTS

| | | | |
|---|---|---|---|
| 3,818,458 A | 6/1974 | Deese | |
| 3,906,450 A | 9/1975 | Prado, Jr. | |
| 3,906,454 A | 9/1975 | Martin | |
| T955,010 I4 | 2/1977 | Ragonese et al. | |
| 4,168,396 A | 9/1979 | Best | |
| 4,230,990 A | 10/1980 | Lert, Jr. et al. | |
| 4,232,193 A | 11/1980 | Gerard | |
| 4,306,289 A | 12/1981 | Lumley | |
| 4,319,079 A | 3/1982 | Best | |
| 4,361,832 A | 11/1982 | Cole | |
| 4,367,525 A | 1/1983 | Brown et al. | |
| 4,558,413 A | 12/1985 | Schmidt et al. | |
| 4,558,991 A | 12/1985 | Barr | |
| 4,590,550 A | 5/1986 | Eilert et al. | |
| 4,595,950 A | 6/1986 | Lofberg | |
| 4,621,325 A | 11/1986 | Naftzger et al. | |
| 4,630,196 A | 12/1986 | Bednar, Jr. et al. | |
| 4,658,093 A | 4/1987 | Hellman | |
| 4,672,572 A | 6/1987 | Alsberg | |
| 4,685,056 A | 8/1987 | Barnsdale, Jr. et al. | |
| 4,696,034 A | 9/1987 | Wiedemer | |
| 4,703,324 A | 10/1987 | White | |
| 4,712,097 A | 12/1987 | Hashimoto | |
| 4,718,005 A | 1/1988 | Feigenbaum et al. | |
| 4,720,782 A | 1/1988 | Kovalcin | |
| 4,734,865 A | 3/1988 | Scullion et al. | |
| 4,740,890 A | 4/1988 | William | |
| 4,745,468 A | 5/1988 | Von Kohorn | |
| 4,747,139 A | 5/1988 | Taaffe | |
| 4,754,262 A | 6/1988 | Hackett et al. | |
| 4,757,533 A | 7/1988 | Allen et al. | |
| 4,769,697 A | 9/1988 | Gilley et al. | |
| 4,791,565 A | 12/1988 | Dunham et al. | |
| 4,821,178 A | 4/1989 | Levin et al. | |
| 4,825,354 A | 4/1989 | Agrawal et al. | |
| 4,827,508 A | 5/1989 | Shear | |
| 4,866,769 A | 9/1989 | Karp | |
| 4,876,592 A | 10/1989 | Von Kohorn | |
| 4,914,689 A | 4/1990 | Quade et al. | |
| 4,926,162 A | 5/1990 | Pickell | |
| 4,926,255 A | 5/1990 | Von Kohorn | |
| 4,940,976 A | 7/1990 | Gastouniotis et al. | |
| 4,943,963 A | 7/1990 | Waechter et al. | |
| 4,956,769 A | 9/1990 | Smith | |
| 4,970,644 A | 11/1990 | Berneking et al. | |
| 4,972,503 A | 11/1990 | Zurlinden | |
| 4,977,594 A | 12/1990 | Shear | |
| 5,023,907 A | 6/1991 | Johnson et al. | |
| 5,032,979 A | 7/1991 | Hecht et al. | |
| 5,034,807 A | 7/1991 | Von Kohorn | |
| 5,057,915 A | 10/1991 | Von Kohorn | |
| 5,086,386 A | 2/1992 | Islam | |
| 5,103,498 A * | 4/1992 | Lanier et al. | 706/58 |
| 5,113,518 A | 5/1992 | Durst, Jr. et al. | |
| 5,128,752 A | 7/1992 | Von Kohorn | |
| 5,182,770 A | 1/1993 | Medveczky et al. | |
| 5,204,897 A | 4/1993 | Wyman | |
| 5,214,780 A | 5/1993 | Ingoglia et al. | |
| 5,222,874 A | 6/1993 | Unnewehr et al. | |
| 5,233,642 A | 8/1993 | Renton | |
| 5,283,734 A | 2/1994 | Von Kohorn | |
| 5,287,408 A | 2/1994 | Samson | |
| 5,317,635 A | 5/1994 | Stirling et al. | |
| 5,343,239 A | 8/1994 | Lappington et al. | |
| 5,355,484 A | 10/1994 | Record et al. | |
| 5,374,951 A | 12/1994 | Welsh | |
| 5,377,269 A | 12/1994 | Heptig et al. | |
| 5,388,211 A | 2/1995 | Hornbuckle | |
| 5,406,269 A | 4/1995 | Baran | |
| 5,410,598 A | 4/1995 | Shear | |
| 5,440,738 A | 8/1995 | Bowman et al. | |
| 5,444,642 A | 8/1995 | Montgomery et al. | |
| 5,450,134 A | 9/1995 | Legate | |
| 5,463,616 A * | 10/1995 | Kruse et al. | 370/276 |
| 5,481,294 A | 1/1996 | Thomas et al. | |
| 5,483,658 A | 1/1996 | Grube et al. | |
| 5,488,648 A | 1/1996 | Womble | |
| 5,490,060 A | 2/1996 | Malec et al. | |
| 5,497,479 A | 3/1996 | Hornbuckle | |
| 5,499,340 A | 3/1996 | Barritz | |
| 5,508,731 A | 4/1996 | Kohorn | |
| 5,519,433 A | 5/1996 | Lappington et al. | |
| 5,526,035 A | 6/1996 | Lappington et al. | |
| 5,533,021 A | 7/1996 | Branstad et al. | |
| 5,557,334 A | 9/1996 | Legate | |
| 5,559,808 A | 9/1996 | Kostreski et al. | |
| 5,561,010 A | 10/1996 | Hanyu et al. | |
| 5,584,025 A | 12/1996 | Keithley et al. | |
| 5,584,050 A | 12/1996 | Lyons | |
| 5,594,934 A | 1/1997 | Lu et al. | |
| 5,606,604 A | 2/1997 | Rosenblatt et al. | |
| 5,610,916 A | 3/1997 | Kostreski et al. | |
| 5,621,395 A | 4/1997 | Kiyaji et al. | |
| 5,638,113 A | 6/1997 | Lappington et al. | |
| 5,640,192 A | 6/1997 | Garfinkle | |
| 5,646,675 A | 7/1997 | Copriviza et al. | |
| 5,646,942 A | 7/1997 | Oliver et al. | |
| 5,654,748 A | 8/1997 | Matthews, III | |
| 5,666,365 A | 9/1997 | Kostreski | |
| 5,675,510 A * | 10/1997 | Coffey et al. | 709/224 |
| 5,697,844 A | 12/1997 | Von Kohorn | |
| 5,701,582 A | 12/1997 | DeBey | |
| 5,713,795 A | 2/1998 | Kohorn | |
| 5,724,103 A | 3/1998 | Batchelor | |
| 5,724,521 A * | 3/1998 | Dedrick | 705/26.1 |
| 5,727,129 A | 3/1998 | Barett et al. | |
| 5,729,472 A * | 3/1998 | Seiffert et al. | 702/188 |
| 5,729,549 A | 3/1998 | Kostreski et al. | |
| 5,732,218 A | 3/1998 | Bland et al. | |
| 5,734,413 A | 3/1998 | Lappington et al. | |
| 5,734,720 A | 3/1998 | Salganicoff | |
| 5,740,549 A | 4/1998 | Reilly et al. | |
| 5,745,760 A | 4/1998 | Kawamura et al. | |
| 5,751,707 A | 5/1998 | Voit et al. | |
| 5,754,938 A | 5/1998 | Herz et al. | |
| 5,754,939 A | 5/1998 | Herz et al. | |
| 5,758,257 A | 5/1998 | Herz et al. | |
| 5,759,101 A | 6/1998 | Von Kohorn | |
| 5,761,606 A | 6/1998 | Wolzien | |
| 5,764,275 A | 6/1998 | Lappington et al. | |
| 5,768,382 A | 6/1998 | Schneier et al. | |
| 5,771,354 A | 6/1998 | Crawford | |
| 5,774,664 A | 6/1998 | Hidary et al. | |
| 5,787,253 A | 7/1998 | McCreery et al. | |
| 5,793,410 A | 8/1998 | Rao | |
| 5,796,633 A * | 8/1998 | Burgess et al. | 702/187 |
| 5,796,952 A | 8/1998 | Davis et al. | |
| 5,802,304 A * | 9/1998 | Stone | 709/227 |
| 5,812,928 A | 9/1998 | Watson, Jr. et al. | |
| 5,819,156 A | 10/1998 | Belmont | |
| 5,833,468 A | 11/1998 | Guy et al. | |
| 5,848,396 A | 12/1998 | Gerace | |
| 5,857,190 A | 1/1999 | Brown | |
| 5,872,588 A * | 2/1999 | Aras et al. | 725/14 |
| 5,878,384 A | 3/1999 | Johnson et al. | |
| 5,887,140 A | 3/1999 | Itsumi et al. | |
| 5,892,917 A | 4/1999 | Myerson | |
| 5,905,713 A | 5/1999 | Anderson et al. | |
| 5,937,392 A | 8/1999 | Alberts | |
| 5,944,780 A | 8/1999 | Chase et al. | |
| 5,945,988 A | 8/1999 | Williams et al. | |
| 5,951,642 A | 9/1999 | Onoe et al. | |
| 5,978,842 A | 11/1999 | Noble et al. | |
| 5,987,611 A | 11/1999 | Freund | |
| 5,991,807 A | 11/1999 | Schmidt et al. | |
| 5,999,912 A | 12/1999 | Wodarz et al. | |
| 6,006,217 A | 12/1999 | Lumsden | |
| 6,006,332 A | 12/1999 | Rabne et al. | |
| 6,018,619 A * | 1/2000 | Allard et al. | 709/224 |
| 6,061,082 A | 5/2000 | Park | |
| 6,061,719 A | 5/2000 | Bendinelli et al. | |
| 6,108,637 A * | 8/2000 | Blumenau | 715/204 |
| 6,115,680 A | 9/2000 | Coffee et al. | |
| 6,138,155 A | 10/2000 | Davis et al. | |

(56) References Cited

U.S. PATENT DOCUMENTS

| | | | |
|---|---|---|---|
| 6,199,206 B1 | 3/2001 | Nishioka et al. | |
| 6,202,210 B1 | 3/2001 | Ludtke | |
| 6,381,632 B1* | 4/2002 | Lowell | 709/203 |
| 6,421,445 B1 | 7/2002 | Jensen et al. | |
| 6,477,707 B1 | 11/2002 | King et al. | |
| 6,510,462 B2 | 1/2003 | Blumenau | |
| 6,574,594 B2 | 6/2003 | Pitman et al. | |
| 7,206,494 B2 | 4/2007 | Engle et al. | |
| 7,607,147 B1* | 10/2009 | Lu et al. | 725/14 |
| 7,644,422 B2* | 1/2010 | Lu et al. | 725/9 |
| 2001/0028662 A1 | 10/2001 | Hunt et al. | |
| 2001/0044751 A1 | 11/2001 | Pugliese et al. | |
| 2001/0047517 A1 | 11/2001 | Christopoulos et al. | |
| 2001/0056405 A1 | 12/2001 | Muyres et al. | |
| 2002/0002488 A1 | 1/2002 | Muyres et al. | |
| 2002/0032904 A1 | 3/2002 | Lerner | |
| 2002/0053078 A1 | 5/2002 | Holtz et al. | |
| 2002/0056086 A1 | 5/2002 | Yuen | |
| 2002/0056089 A1 | 5/2002 | Houston | |
| 2002/0065826 A1 | 5/2002 | Bell et al. | |
| 2002/0087967 A1 | 7/2002 | Conkwright et al. | |
| 2002/0087969 A1 | 7/2002 | Brunheroto et al. | |
| 2002/0101083 A1 | 8/2002 | Toledano et al. | |
| 2002/0111934 A1 | 8/2002 | Narayan | |
| 2002/0133412 A1 | 9/2002 | Oliver et al. | |
| 2003/0041141 A1 | 2/2003 | Abdelaziz et al. | |
| 2003/0056208 A1 | 3/2003 | Kamada et al. | |
| 2003/0070167 A1 | 4/2003 | Holtz et al. | |
| 2003/0088674 A1 | 5/2003 | Ullman et al. | |
| 2010/0138770 A1* | 6/2010 | Lu et al. | 715/771 |

FOREIGN PATENT DOCUMENTS

| | | |
|---|---|---|
| CN | 1253692 | 5/2000 |
| CN | 101262292 | 9/2008 |
| DE | 69736435 | 12/2006 |
| EP | 0309269 | 3/1989 |
| EP | 0325219 | 7/1989 |
| EP | 0703683 | 3/1996 |
| EP | 0744695 | 11/1996 |
| EP | 0944991 | 9/1999 |
| EP | 1089201 | 4/2001 |
| EP | 1089564 | 4/2001 |
| GB | 2176639 | 12/1986 |
| JP | 5324352 | 12/1993 |
| JP | 5347648 | 12/1993 |
| JP | 6085966 | 3/1994 |
| JP | 7123392 | 5/1995 |
| JP | 2002247610 | 8/2002 |
| JP | 4408453 | 11/2009 |
| WO | 8907868 | 8/1989 |
| WO | 9600950 | 1/1996 |
| WO | 9617467 | 6/1996 |
| WO | 9628904 | 9/1996 |
| WO | 9632815 | 10/1996 |
| WO | 9637983 | 11/1996 |
| WO | 9641495 | 12/1996 |
| WO | 9715007 | 4/1997 |
| WO | 9826529 | 6/1998 |
| WO | 9826571 | 6/1998 |
| WO | 9831155 | 7/1998 |
| WO | 0119088 | 3/2001 |
| WO | 0124027 | 4/2001 |
| WO | 02098029 | 12/2002 |

OTHER PUBLICATIONS

United States Patent and Trademark Office, "Notice of Allowance and Examiner's Interview Summary," issued in connection with U.S. Appl. No. 08/763,750, on Jun. 26, 2009 (8 pages).

United States Patent and Trademark Office, "Non-Final Office Action," issued in connection with U.S. Appl. No. 08/763,750, on Nov. 17, 2009 (13 pages).

United States Patent and Trademark Office, "Advisory Action," issued in connection with U.S. Appl. No. 08/763,750, on Jun. 2, 2008 (3 pages).

United States Patent and Trademark Office, "Examiner's Interview Summary," issued in connection with U.S. Appl. No. 08/763,750, on Apr. 30, 2008 (2 pages).

United States Patent and Trademark Office, "Final Office Action," issued in connection with U.S. Appl. No. 08/763,750, on Mar. 17, 2008 (13 pages).

United States Patent and Trademark Office, "Non-Final Office Action," issued in connection with U.S. Appl. No. 08/763,750, on Sep. 10, 2007 (13 pages).

United States Patent and Trademark Office, "Final Office Action," issued in connection with U.S. Appl. No. 08/763,750, on Apr. 6, 2006 (5 pages).

United States Patent and Trademark Office, "Advisory Action," issued in connection with U.S. Appl. No. 08/763,750, on Oct. 17, 2003 (3 pages).

United States Patent and Trademark Office, "Final Office Action," issued in connection with U.S. Appl. No. 08/763,750, on May 15, 2003 (16 pages).

United States Patent and Trademark Office, "Non-Final Office Action," issued in connection with U.S. Appl. No. 08/763,750, on Nov. 27, 2002 (11 pages).

United States Patent and Trademark Office, "Final Office Action," issued in connection with U.S. Appl. No. 08/763,750, on Sep. 10, 2002 (14 pages).

United States Patent and Trademark Office, "Non-Final Office Action," issued in connection with U.S. Appl. No. 08/763,750, on Sep. 11, 2001 (19 pages).

United States Patent and Trademark Office, "Election/Restriction Requirement," issued in connection with U.S. Appl. No. 08/763,750, on Jan. 17, 2001 (18 pages).

United States Patent and Trademark Office, "Non-Final Office Action," issued in connection with U.S. Appl. No. 08/763,750, on Aug. 19, 1999 (7 pages).

United States Patent and Trademark Office, "Election/Restriction Requirement," issued in connection with U.S. Appl. No. 08/763,750, on Mar. 29, 1999 (4 pages).

Japanese Patent Office, "Office Action (Notification Document of Refusal Reasons)," issued in connection with Japanese Patent Application Serial No. 526729, on Oct. 21, 2008, with its English language translation (8 pages).

Patent Cooperation Treaty, "International Search Report," issued by the International Searching Authority in connection with PCT application No. PCT/US1997/021643, mailed Nov. 12, 1998 (12 pages).

Tally Systems Corp, "Tally Systems Patents Software Inventorying Technology," retrieved from www.tallysys.com, on Jul. 1, 1996 (5 pages).

United States Patent and Trademark Office, "Notice of Allowance," issued in connection with U.S. Appl. No. 10/284,409, on Oct. 8, 2009 (4 pages).

United States Patent and Trademark Office, "Advisory Action," issued in connection with U.S. Appl. No. 10/284,409, on Aug. 19, 2009 (2 pages).

United States Patent and Trademark Office, "Final Office Action," issued in connection with U.S. Appl. No. 10/284,409, on Jun. 18, 2009 (9 pages).

United States Patent and Trademark Office, "Non-Final Office Action," issued in connection with U.S. Appl. No. 10/284,409, on Dec. 30, 2008 (11 pages).

United States Patent and Trademark Office, "Advisory Action," issued in connection with U.S. Appl. No. 10/284,409, on Jun. 3, 2008 (3 pages).

United States Patent and Trademark Office, "Final Office Action," issued in connection with U.S. Appl. No. 10/284,409, on Mar. 18, 2008 (11 pages).

United States Patent and Trademark Office, "Non-Final Office Action," issued in connection with U.S. Appl. No. 10/284,409, on Oct. 5, 2007 (10 pages).

Patent Cooperation Treaty, "International Preliminary Examination Report," issued by the International Preliminary Examining Authority in connection with PCT application No. PCT/US1997/021643, mailed Mar. 30, 1999 (27 pages).

(56) References Cited

OTHER PUBLICATIONS

Patent Cooperation Treaty, "Written Opinion," issued by the International Searching Authority in connection with PCT application No. PCT/US1997/021643, mailed Feb. 24, 1999 (7 pages).
Canadian Intellectual Property Office, "Notification of a Requisition by the Examiner," issued in connection with Canadian Patent Application Serial No. 2,279,847, on Jul. 20, 2009 (2 pages).
Australian Intellectual Property Office, "Notice of Acceptance," issued in connection with Australian Patent Application Serial No. 52668/98, on Jun. 27, 2000 (2 pages).
Australian Intellectual Property Office, "Examiner's First Report," issued in connection with Australian Patent Application Serial No. 52668/98, on Feb. 11, 2000 (1 page).
The State Intellectual Property Office of China, "Notice of Acceptance of the Request for Reexamination," issued in connection with Chinese Patent Application Serial No. 97182123.2, on May 18, 2005, with its English language translation (2 pages).
The State Intellectual Property Office of China, "Decision of Reexamination," issued in connection with Chinese Patent Application Serial No. 97182123.2, on Jul. 6, 2005, with its English language translation (2 pages).
The State Intellectual Property Office of China, "Notice of Completion of Formalities for Patent Registration," issued in connection with Chinese Patent Application Serial No. 97182123.2, on Jan. 25, 2008, with its English language translation (5 pages).
The State Intellectual Property Office of China, "First Office Action," issued in connection with Chinese Patent Application Serial No. 97182123.2, on Dec. 13, 2002, with its English language translation (11 pages).
The State Intellectual Property Office of China, "First Notification of Office Action," issued in connection with Chinese Patent Application Serial No. 97182123.2, on Jul. 3, 2009, with its English language translation (7 pages).
European Patent Office, "Decision to Grant a European Patent Pursuant to Article 97(2) EPC," issued in connection with European Patent Application Serial No. 97947628.0, on Jul. 6, 2006 (1 page).
European Patent Office, "Communication Under Rule 51(4) EPC," issued in connection with European Patent Application Serial No. 97 947 628.0, on Feb. 7, 2006 (6 pages).
European Patent Office, "Communication Pursuant to Article 96(2) EPC," issued in connection with European Patent Application Serial No. 97 947 628.0, on Apr. 29, 2005 (3 pages).
European Patent Office, "Communication Pursuant to Article 96(2) EPC," issued in connection with European Patent Application Serial No. 97 947 628.0, on Jul. 19, 2004 (3 pages).
Japanese Patent Office, "Notice of Allowance," issued in connection with Japanese Patent Application Serial No. Hei 10-526729, on Oct. 27, 2009, with its English language translation (5 pages).
Japanese Patent Office, "Decision of Rejection," issued in connection with Japanese Patent Application Serial No. Hei 10-526729, on Apr. 7, 2009, with its English language translation (5 pages).
Australian Intellectual Property Office, "Examiner's First Report," issued in connection with Australian Patent Application Serial No. 71527/00, on May 21, 2002 (1 page).
Australian Intellectual Property Office, "Response to Applicant's Request Under Section 104 of the Patents Act 1990," issued in connection with Australian Patent Application Serial No. 71527/00, on Jan. 16, 2001 (1 page).
Australian Intellectual Property Office, "Notice of Acceptance," issued in connection with Australian Patent Application Serial No. 71524/00, on Sep. 9, 2003 (2 pages).
Australian Intellectual Property Office, "Examiner's First Report," issued in connection with Australian Patent Application Serial No. 71524/00, on May 21, 2002 (2 pages).
Australian Intellectual Property Office, "Examiner's First Report," issued in connection with Australian Patent Application Serial No. 71525/00, on May 21, 2002 (1 page).
Australian Intellectual Property Office, "Notice of Acceptance," issued in connection with Australian Patent Application Serial No. 71526/00, on Sep. 9, 2003 (2 pages).
Australian Intellectual Property Office, "Examiner's First Report," issued in connection with Australian Patent Application Serial No. 71526/00, on May 21, 2002 (1 page).
"Internet Access Without a PC," World Gate Communications (Press Release, Apr. 29, 1996) (3 pages).

"Lan Times 1995 Index: Application Administration & Management," LAN Times (1995) (5 pages).
R. Lisle, "The Management Features in Software-Metering Tools Can Save You a Bundle," LAN Times, Jul. 3, 1995 (3 pages).
T. Johnson, "Research in the Future: The Role and Measurement of the Internet," ARF 60$^{th}$ Anniversary Annual Conference and Research Expo, Mar. 11-13, 1996 (4 pages).
"The Top Five Advertising Agencies Now Subscribe to PC-Meter Web Measurement Services," at http://www.npd.com:80/pcmpr10.htm on Jul. 1, 1996 (2 pages).
"Demographics," at http://www.w3.org/pub/WWW/Demographics on Oct. 4, 1996 (3 pages).
D. Hoffman et al., "How Big is the Internet," Aug. 18, 1994 (2 pages).
M. Brownstein, "Streamlined and Ready for Action," Netguide (1996), pp. 81, 83-86, 88, 90, 95-96.
B. Harvey, "Interactive Standards," The Marketing Pulse, vol. XIV, Issue 12, Aug. 31, 1994, pp. 1-6.
Chiat/Day, "The New Video Highway: What Will We Need to Know? How Will We Measure It?" Advertising Research Foundation, Jun. 29, 1994, pp. 1-12.
M. Green et al., "The Evolution of Research Problems on the Information Superhighway," JMCT Media Research, Jun. 1994 (7 pages).
Draft of "Recommended Guidelines for Interactive Advertising and Research," Next Century Media, Inc., pp. 1-10.
"Preliminary Summary Overview of Studies of Interactivity for 4AS Casie Research Sub-Committee," Next Century Media, Inc., pp. 1-11.
Release Notes for NeTraMet as found on The Worldwide Web on Jul. 1, 1996 (2 pages).
Infoseek Internet Search Results When Searching for "NPD" on Jul. 1, 1996 (2 pages).
Print of page from The Worldwide Web, http://www.npd.com/pcmdef.htm on Jul. 1, 1996 (1 page).
Print of page from The Worldwide Web, http://www.npd.com:80/pcmeter.htm on Jul. 1, 1996 (1 page).
Print of page from The Worldwide Web, http://www.npd.com:80/pcmpr.htm on Jul. 1, 1996 (1 page).
E. English, "The Meter's Running," LAN Times, Mar. 27, 1995 (2 pages).
Marketing News, Jun. 3, 1996, Section: 1996 Business Report on the Marketing Research Industry (36 pages).
C. Graziano, "Cash, Check, or Charge?" LAN Times, Apr. 24, 1995 (1 page).
"Latest NPD Survey Finds World Wide Web Access from Homes Grew Fourfold in Second Half of 1995," from http://www.npd.com:80/meterpr4.htm on Jul. 1, 1996 (1 page).
"First Demographic Data on Home World Wide Web Use Now Available from the NPD Group," from http://www.npd.com:80/meterpr6.htm on Jul. 1, 1996 (2 pages).
"America Online is Leading Destination of Web Surfers in First-ever PC-Meter Sweeps Citing Top 25 Web Sites," from http://www.npd.com:80/meterpr5.htm on Jul. 1, 1996 (3 pages).
"NPD's PC-Meter Service to Provide More Accurate Measure of World Wide Web Traffic," from http://www.npd.com:80/meterpr.htm on Jul. 1, 1996 (1 page).
"PC-Meter Now in 1,000 Households Nationwide," from http://www.npd.com:80/meterpr2.htm on Jul. 1, 1996 (1 page).
"PC-Meter Predicts Happy Holidays for Computer Manufacturers and Retailers," http://www.npd.com:80/meterpr3.htm on Jul. 1, 1996 (1 page), Dec. 1, 1995.
Electronic News, vol. 42, No. 2110, Monday, Apr. 1, 1996 (4 pages).
Interactive Marketing News, Friday, Jul. 5, 1996 (1 page).
Minority Markets Alert, vol. 8, No. 2, ISSN: 1041-7524, Thursday, Feb. 1, 1996 (1 page).
Advertising Age, Special Report, Monday, May 30, 1996 (1 page).
Charlottesville Business Journal, vol. 7, No. 2, Thursday, Feb. 1, 1996 (6 pages).
"Tally Systems Patents Software Inventorying Technology," Software Inventorying Technology, Jul. 1, 1996 (5 pages).
P. Helsinki, "Automating Web-Site Maintenance Part 2 Perl-Based Tools to Manage Your Website," Web Techniques, vol. 1, No. 9, XP-002048313, Dec. 1996, pp. 75-78.
M. Lafferty, "Taking the PC Out of the Data Comm Loop: New Techniques Bring Mass Market and Net Together on TV," CED: Communications Engineering and Design, vol. 22, No. 9, XP-002079179, Aug. 1996, pp. 34-38.

\* cited by examiner

INTERACTIVE SERVICE DEVICE METERING SYSTEMS

RELATED APPLICATIONS

This application is a continuation of U.S. application Ser. No. 10/284,409, which was filed on Oct. 31, 2002, which is a division of U.S. patent application Ser. No. 08/763,750, which filed on Dec. 11, 1996 (now U.S. Pat. No. 7,607,147), both of which are incorporated herein by reference in their entireties.

TECHNICAL FIELD OF THE INVENTION

The present invention is directed to metering systems for metering usage of on-line services such as the Internet, off-line services such as software application programs, and other services.

BACKGROUND

The Internet and its multimedia component, the Web, have become an integral part of the way in which content is delivered to end users. For example, newspapers, magazines, and television and cable networks have Web sites that are increasingly being used to deliver content.

This content delivered by on-line service providers is accessed by end users by way of on-line service access devices. The on-line service access device most often in use currently is the personal computer. The personal computer may or may not share a monitor with a television. However, non-personal-computer on-line service access devices are being developed that will enable end users to connect to the Internet. These non-personal-computer on-line service access devices include, for example, (i) a network computer (having a basic RAM, little or no hard disk capacity, a modem, a monitor, and a keyboard; for more permanent storage, a network computer may rent storage at a remote location), (ii) a gaming device (such as those used with or without televisions in order to play video games), (iii) an Internet television (for example, a television equipped with an external Web box, or an Internet enabled television which is a television internally equipped with Internet access capability), (iv) an Internet telephone (a telephone that is Internet enabled), (v) an Internet hand held calculator (a hand held calculator that is Internet enabled, and (vi) the like. All such on-line service access devices are referred to herein as interactive service devices (ISDs).

Many people desire to determine the amount and nature of interest in the content provided to end users. For example, advertisers who use the Internet to deliver ads to end users may find it useful to know the number of times that their ads are accessed by end users, the length of time that the end users spend at the ads, and the demographics relating to the end users who access their ads. Such information may indicate the target audience for, and popularity of, their products and/or services. This information may also be useful in determining the success of certain advertising campaigns. On-line service providers may also desire to determine the amount and nature of interest in the content that they provide.

Certain web sites currently meter access to the content that they provide. However, metering Internet usage at a web site provides little opportunity to non-intrusively determine the demographics of the end users who are accessing the web site. Moreover, although the web site determines the number of times that its content is accessed, the web site does not also determine the number of times that other web sites are visited. Accordingly, the web site cannot effectively extrapolate to the entire population or even to the segment of the population accessing content of competing web sites.

It is also known to meter Internet usage through the use of software traps which are stored on the hard drives of personal computers located in statistically selected end user facilities (e.g., households, businesses, and the like). These software traps log each access to the Internet. However, software traps have a number of disadvantages. For example, software traps require all instructions to flow through the software traps. This requirement adds delay in the processing of these instructions. Accordingly, software traps slow down computer processing and can be, therefore, annoying to computer end users. Moreover, current software traps store the Internet usage data that they log on floppy disks which must be then mailed or otherwise non-electronically sent to a central facility where the information is downloaded and processed along with Internet usage data from other end users in order to generate Internet usage reports. This manner of providing Internet usage data from statistically selected end user facilities to a central facility for report generation places added burdens on the end users and is slow. Furthermore, software traps are not currently able to meter other interactive service devices such as Internet televisions, gaming devices, network computers, and the like.

The present invention is intended to solve one or more of the above-noted problems.

BRIEF DESCRIPTION OF THE DRAWINGS

These and other features and advantages of the present invention will become more apparent from a detailed consideration of the invention when taken in conjunction with the drawings in which.

DETAILED DESCRIPTION

Figure 1:
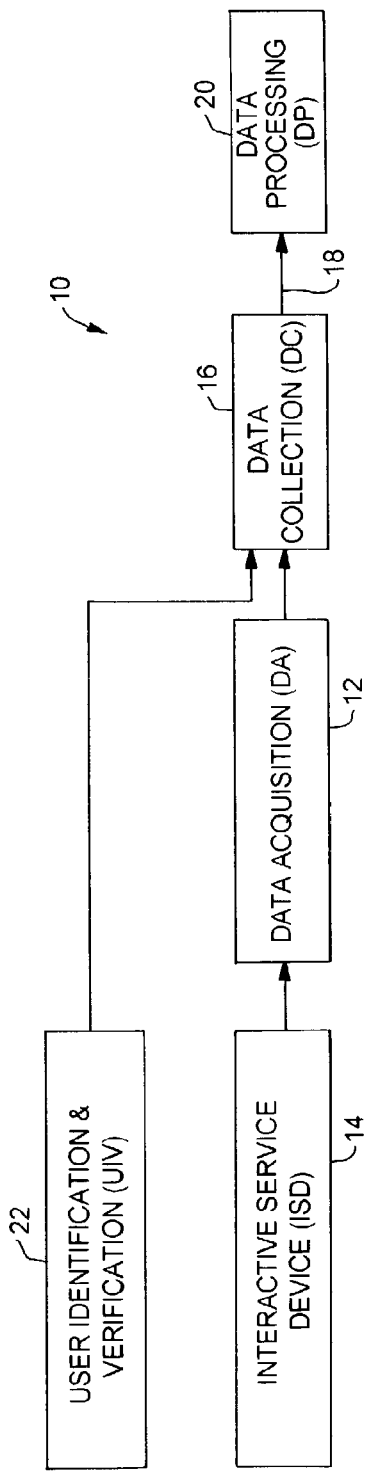
FIG. 1 is a block diagram of a metering system according to the present invention.

As shown in FIG. 1, a metering system 10, which may be located in a statistically selected end user facility, includes a data acquisition module 12 for acquiring usage data relative to an interactive service device 14. As discussed above, an interactive service device may be a personal computer, a personal computer sharing a monitor with a video display device such as a television, a network computer, a gaming device, an Internet television, an Internet telephone, an Internet hand held calculator, and the like. An Internet television is a video display device or monitor which is enabled to communicate over the Internet. An Internet television, for example, may be a television having a web box, an internally enabled Internet television, or a television having a cable converter or modem with Internet communication capability. The Internet includes the worldwide web and/or all similar webs (such as a local web in an intranet environment) or networks or extensions thereof. Usage data as used herein means any and all data relating to a user's use of such on-line resources as the Internet, of such off-line resources as software programs (for example, application programs), such other resources as intranets, and/or the like.

The data acquisition module 12, therefore, may acquire on-line usage data such as data relating to an end user's use of on-line services. Such on-line services may include, for example, the Internet, an intranet, the World Wide Web, E-mail, various provider groups, and the like. The data acquisition module 12 may also acquire off-line usage data, such as data relating to an end user's use of off-line services. Off-line services may include, for example, application programs such as word processing programs, spread sheet programs, and the like, and are typically stored on the interactive service device 14. As disclosed below, the data acquisition module 12 may further acquire television program ratings data. The television program ratings data may be acquired from conventional televisions, from Internet televisions, from a personal computer having a television tuner, and the like.

The data acquisition module 12 acquires usage data with respect to the interactive service device 14, and transfers that usage data to a data collection module 16 which stores the acquired usage data for immediate (real time) or later (non-real time) communication over a communication medium 18 to a data processing module 20. The communication medium 18 may be plain old telephone lines (POTS). The communication medium 18 may alternatively be (i) a cable, (ii) an integrated services digital network (ISDN), (iii) an xDSL such as a digital subscriber line (DSL), an asymmetrical digital subscriber line (ADSL), or a rate adapted digital subscriber line (RADSL), or (iv) any other type of medium (e.g., over-the-air channels) which support communication between the data collection module 16 and the data processing module 20. Any of these communication media may be arranged to permit the data collection module 16 to transmit its data and information to the data processing module 20 during normal phone calls, during on-line service (e.g., Internet) communications, and the like.

A user identification and verification module 22 identifies and verifies the end user who is using the interactive service device 14, and supplies the resulting identification and verification information to the data collection module 16. The user identification and verification module 22 may identify and verify the end user upon each end user logon, or the user identification and verification module 22 may identify and verify the end user periodically. The advantage of periodically identifying and verifying the end user is that the identity of any other end users who may operate the interactive service device using the original end user's logon ID and password will be identified and verified. For example, one or more other end users may operate the interactive service device using the original end user's logon ID and password when the original end user logs onto an interactive service device and then leaves the interactive service device without logging off. During the original end user's absence, one or more other end users may operate the interactive service device, thus using the original end user's logon ID and password.

The user identification and verification module 22 may implement, for example, biometrics recognition or personal characteristic recognition. As an example of biometrics recognition, the user identification and verification module 22 may be of the sort disclosed in U.S. Pat. No. 5,550,928. Such a system includes a camera for acquiring a current image of the end user of the interactive service device 14, and identifies the end user by comparing this current image to reference images stored in memory. However, the system disclosed in that patent is complicated by the fact that the individuals to be recognized by such a system may be anywhere in the field of vision of the camera. On the other hand, the end user to be recognized according to the present invention is typically at a fixed distance, in a fixed location, and in a substantially uniform orientation with respect to the interactive service device 14. Consequently, there may be no need for the scaling, tracking, application of multiple different face recognition techniques, and the like disclosed in the aforementioned '928 patent. Other examples of biometrics recognition include body shape recognition which may be implemented in accordance with the teachings of the aforementioned '928 patent, body temperature recognition as may be implemented through use of an infrared temperature detector, fingerprint recognition as may be implemented through the use of a fingerprint reader, and the like.

As an example of personal characteristic recognition, the user identification and verification module 22 may identify and verify an end user through the use of keystroke recognition as may be implemented by a keystroke monitor that monitors an end user's keystroke style (e.g., fast, slow, sporadic).

Instead of, or in addition to, implementing periodic identification and verification, the user identification and verification module 22 may determine when an end user has left the interactive service device. For example, an infrared temperature detector may be used to determine when an end user leaves the interactive service device and when an end user again appears at the interactive service device. The user identification and verification module 22 may then re-identify and re-verify the end user or require the end user to enter relevant identification and verification information. Alternatively, periods of inactivity exceeding a predetermined amount of time may cause the user identification and verification module 22 to re-identify and re-verify the end user or require the end user to enter relevant identification and verification information.

The data acquisition module 12 may take the form of the passive communication listeners described below. The data collection module 16 may have a storage device and a modem. The storage device stores the user identification and verification information supplied by the user identification and verification module 22 and the usage data acquired by the data acquisition module 12. The modem immediately or periodically transmits this information and data to the data processing module 20.

The data processing module 20 may be a computer at a central facility. Other metering systems, similar to the metering system 10, may be located in a plurality of other statistically selected end user facilities. The data processing module 20 accumulates the usage data and identification and verification information from the metering system 10 and from these other metering systems in order to generate reports based upon the usage data and the identification and verification information as projected over an entire population or relevant segments of the entire population. These reports may report the extent of usage of various on-line and off-line services covered by the usage data and may disclose the nature of the users of these on-line and off-line services.

The metering system 10, and the other metering systems which communicate identification and verification information and usage data to the data processing module 20, need not meter interactive service devices of the same type. Metering systems for metering several different types of interactive service devices in accordance with the present invention are disclosed below by way of example. In order to accommodate the metering of different types of interactive service devices, the data acquisition module 12 is tailored according to each type of interactive service device which is encountered in the statistically selected end user facilities.

Thus, as will become evident from the description below, one of the advantages of the present invention is that the present invention may be used to meter a variety of different interactive service devices. Accordingly, the data acquisition module 12 may take one form if the interactive service device 14 is a personal computer, may take another form if the interactive service device 14 is a network computer, may take still another form if the interactive service device 14 is an Internet television, and so on.

Figure 2:
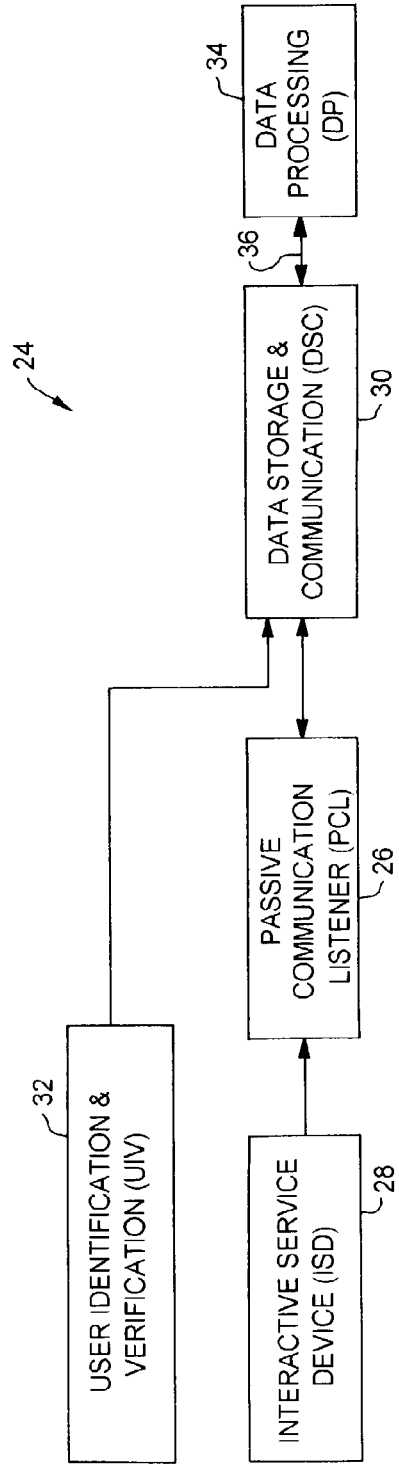
FIG. 2 is a block diagram of a metering system according to the present invention and implements a passive communication listener (PCL) for passively acquiring usage data relating to an interactive service device.

The data acquisition device 12 may advantageously be passive with respect to the operation of the interactive service device being metered. Accordingly, unlike a software trap, the data acquisition module 12 in its passive form is transparent to, and does not noticeably slow down the operation of, the interactive service device being metered. Thus, as shown in FIG. 2, a metering system 24 includes a passive communication listener (PCL) 26 as one type of data acquisition module. The passive communication listener 26 listens to the communications to and from an interactive service device 28 in order to acquire usage data with regard to an end user's use of the interactive service device 28. The passive communication listener 26 may also monitor the end user's use of application programs by way of the interactive service device 28 in order to acquire additional usage data. The passive communication listener 26 transfers the usage data which it acquires to a data storage and communication module 30. The data storage and communication module 30 also receives user identification and verification information from a user identification and verification module 32. The data storage and communication module 30 immediately or periodically transmits the user identification and verification information and the usage data to a data processing module 34.

As in the case of the data acquisition module 12 shown in FIG. 1, the passive communication listener 26 acquires on-line and off-line usage data and can also acquire, if desired, television program ratings data. The television program ratings data may be acquired from conventional televisions, from Internet televisions, from a personal computer having a television tuner, and the like. One of the principal advantages of the passive communication listener 26 is that the passive communication listener 26 is transparent to an end user's use of an interactive service device. The passive communication listeners of the present invention also require fewer upgrades because they principally monitor communication protocols and because communication protocols change infrequently. Electronic communication of the usage data, of the identification and verification information, and of television program ratings data to the data processing module 34 saves operating costs because mailed-in floppy disks do not have to be read.

The data storage and communication module 30 may be similar to the data collection module 16, the user identification and verification module 32 may be similar to the user identification and verification module 22, the communication medium 36 may be similar to the communication medium 18, and the data processing module 34 may be similar to the data processing module 20.

Figure 3:
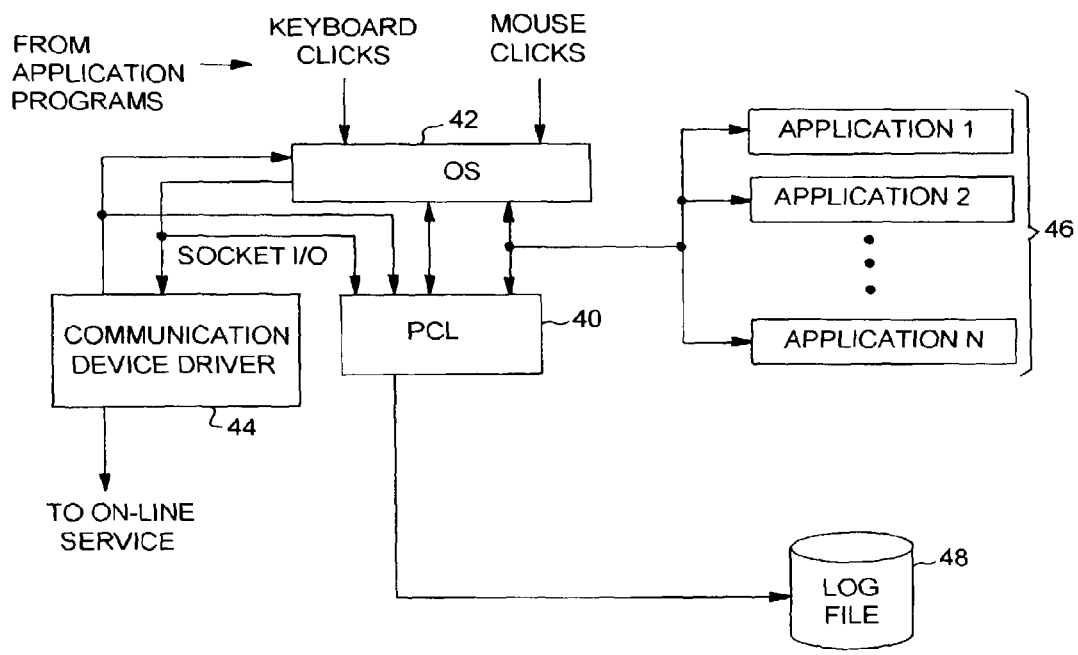
FIG. 3 illustrates a downloadable resident software passive communication listener which may be used for the passive communication listener shown in FIG. 2.

As illustrated in FIG. 3, a passive communication listener according to the present invention may take the form of a resident software passive communication listener 40. For example, the resident software passive communication listener 40 may be an agent (or add-on) in a web browser, or it may be an insertable resident routine in a computer's operating system or in a web browser. As illustrated in FIG. 3, the resident software passive communication listener 40 is arranged (i) to monitor on-line service usage, without any noticeable delay, by monitoring the information which flows from an operating system 42 to a communication device driver 44 and which can indicate access to on-line services, (ii) to monitor off-line service usage by monitoring information which flows from an operating system 42 to application programs 46, and which indicates access to the application programs, (iii) to monitor keyboard clicks, mouse clicks, touch-screen touches, remote control signals, remote keyboard signals, remote mouse signals, and the like which are processed by an operating system 42 and which indicate scrolling and the like. The resident software passive communication listener 40 further monitors communication between the communication device driver 44 and the operating system 42 in order to acquire usage data relating to the on-line content delivered by on-line service providers or web sites. The resident software passive communication listener 40 stores the acquired usage data in a memory such as a log file 48. The usage data logged in the log file 48 may be periodically or immediately transmitted to a central facility.

The resident software passive communication listener 40 is a software tap operating similarly to the wire tapping passive communication listeners described below. The resident software passive communication listener 40 may be installed in an operating system, and creates several possible processing threads. For example, when a line (such as a serial communication line or a direct LAN line) is being used, the resident software passive communication listener 40 copies but does not immediately process the transmitted data. During periods when the CPU of the computer on which the resident software passive communication listener 40 is resident is not being heavily used, the resident software passive communication listener 40 interrogates the copied transmissions and logs items of interest (such as URL's, HTML tags, and the like). This procedure is different from a software trap because a software trap processes the transmissions in real time, whereas the resident software passive communication listener 40 processes the transmissions at near real time and, thus, does not slow down the transmissions in a way that is perceived by the user. Also, the resident software passive communication listener 40 does not alter the data streams or process flow of the socket-level transmissions.

Figure 4:
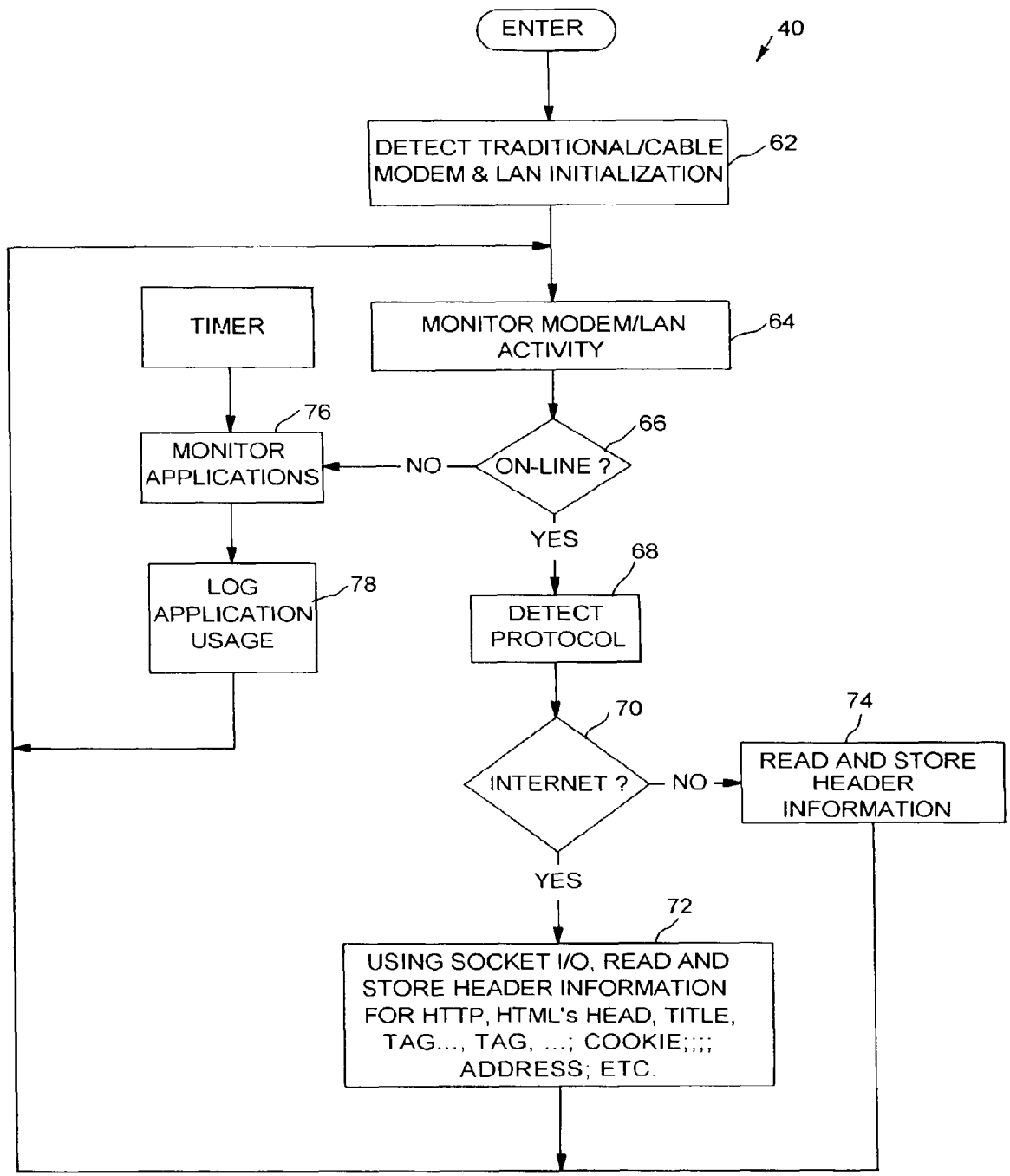
FIG. 4 is a flow chart representing one embodiment of the downloadable resident software passive communication listener of FIG. 3.

The resident software passive communication listener 40 is an event driven program. As shown in FIG. 4, the resident software passive communication listener 40 includes a block 62 which detects initialization of a modem and/or a local area network (LAN) that may indicate the beginning of an access to an on-line or off-line service. If the computer on which the resident software passive communication listener 40 is resident is not a LAN-based computer, then the block 62 may be arranged to detect initialization of the computer itself.

Upon such initialization, a block 64 then monitors the modem and LAN (or other local computer) activity which indicates on-line and off-line service events. For example, the block 64 may monitor access to a web browser or the like which indicates the beginning of an access to an on-line service provider or web site. Also, the block 64 may monitor access to an application program or the like which indicates the beginning of an access to an off-line service. A block 66 determines whether the activity monitored by the block 64 is on-line or off-line activity. If the activity is on-line activity, a block 68 detects the communication protocol. For example, the block 68 may determine whether an on-line communication has an HTTP header indicating the beginning of an Internet communication.

A block 70 determines whether the detected communication protocol is an Internet protocol. If so, a block 72 uses the connection between the operating system 42 and the communication device driver 44 in order to read the header information of the Internet communication. For example, the block 72 reads the header information for the HTTP designation, reads the HTML's header, the title, tags, cookies, addresses, and so on that may be contained in the Internet communication. The block 72 causes this data to be stored in the log file 48.

If the block 70 determines that the communication protocol detected by the block 68 is not an Internet protocol (such that the protocol relates to another on-line service), a block 74 reads the header information, as well as any other pertinent information that is desired, from the detected communication and causes this information to be stored in the log file 48.

If the block 66 determines that the activity monitored by the block 64 is not on-line activity, a block 76 monitors the usage of one or more of the application programs 46. For example, the block 76 may determine which application programs are accessed and may monitor keyboard clicks, mouse clicks, touch-screen touches, remote control signals, remote keyboard signals, remote mouse signals, and the like in order to determine the extent of usage of the accessed application programs. A block 78 logs this application program related usage data in the log file 48. The usage data logged by the block 78 may include an identification of the application program being accessed by the end user of the computer in which the resident software passive communication listener 40 is resident, the length of time that the end user is actively using the accessed application program, and any other information which is desirable. The block 76 may also be executed as a result of a timer event to periodically monitor application events.

After the block 72 reads the header information for the HTTP designation, reads the HTML's header, the title, tags, cookies, addresses, and so on of an Internet communication, after the block 74 reads the header information, as well as any other pertinent information that is desired, from the detected communication of another on-line communication, or after the block 78 logs application program related usage data in the log file 48, program flow returns to the block 64.

Figure 5:
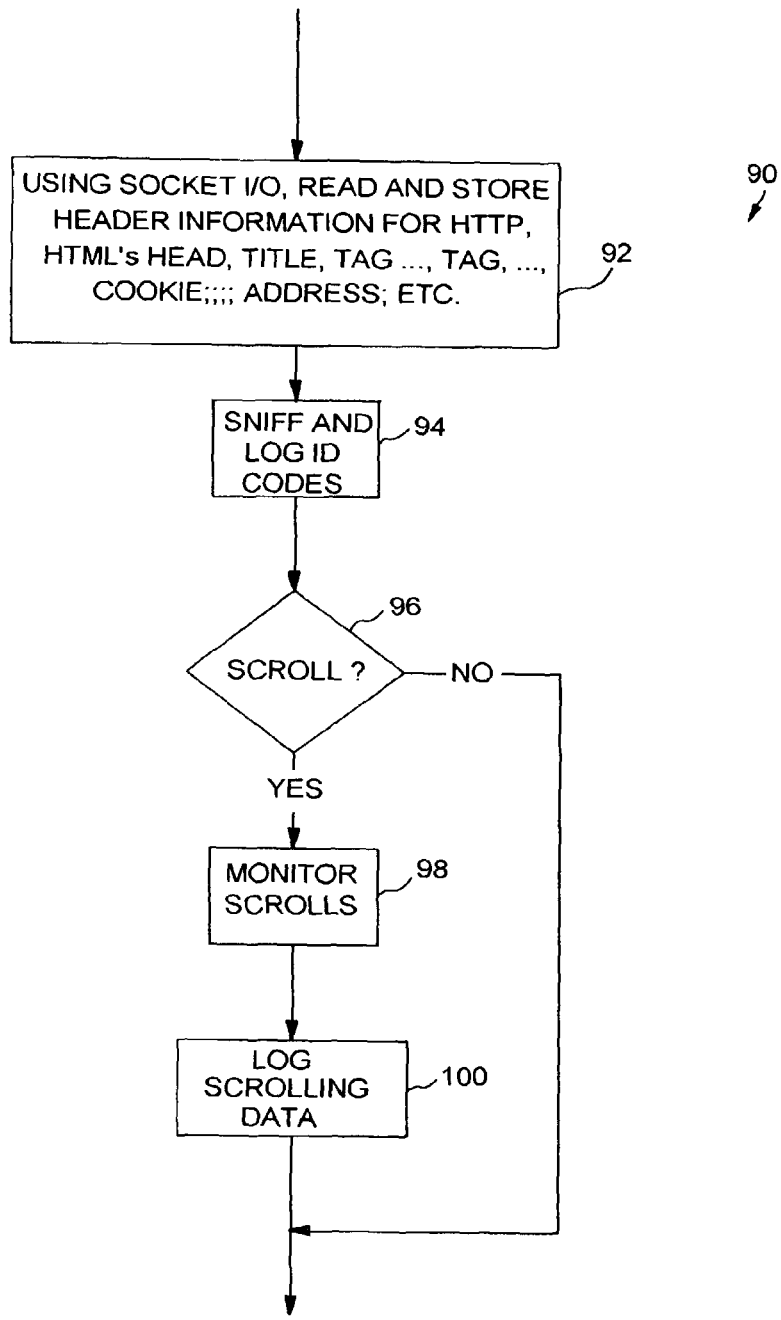
FIG. 5 is a flow chart representing another embodiment of the downloadable resident software passive communication listener of FIG. 3.

With respect to the metering of on-line service usage, the resident software passive communication listener 40 as embodied in FIG. 4 is primarily useful in metering an end user's access to on-line services rather than the end user's use of the content that is delivered as a result of the access. If metering an end user's use of the delivered content is desirable, a program 90, which is shown in FIG. 5, may be implemented as a modification of the resident software passive communication listener 40 shown in FIG. 4.

The program 90 replaces the block 72 shown in FIG. 4. A block 92 of the program 90 performs the same functions as the block 72. In addition, a block 94 detects the presence of any identification codes which may be embedded in the content delivered to the corresponding interactive service device. For example, these identification codes may be used to identify specific content or portions of content provided by an on-line service. The identification codes may be embedded in the Internet data packets transmitted by the accessed on-line service provider or web site to the accessing interactive service device, in graphics such as computer graphics, in video signals, in audio signals, and the like. The block 94 logs any identification codes which it detects in a log file.

A block 96 determines whether any of the content delivered to the corresponding interactive service device is being scrolled. The block 96 may make this determination by monitoring related keyboard clicks, mouse clicks, touch-screen touches, remote control signals, remote keyboard signals, remote mouse signals, and the like. If the content delivered to the corresponding interactive service device is being scrolled, a block 98 monitors the scrolling in order to determine which portions of the delivered content are being displayed on the monitor to the end user and how long each portion is in the active display of the monitor. Thus, the provider of the content can make conclusions regarding the extent of end user interest in the content as a whole and also in specific portions of the content. A block 100 logs such scrolling data in the log file.

If the block 94 does not detect scrolling, or after the block 100 logs the scrolling data, program flow returns to the block 64 of FIG. 4.

The program 90 can also replace the block 74 shown in FIG. 4. In this case, the block 92 would be modified to read and store relevant data from headers of other on-line service providers or web sites.

The resident software passive communication listener 40 may be downloadable over one of the communication media described above to the computer on which the resident software passive communication listener 40 is resident. Accordingly, the resident software passive communication listener 40 may be changed from time to time as communication protocols change, as the need for particular usage data changes, and/or as the particular interactive service device being monitored changes.

Figure 6:
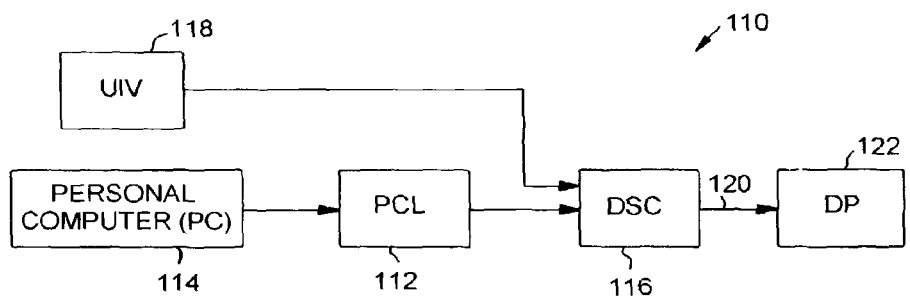
FIG. 6 is a block diagram of a metering system according to the present invention having a passive communication listener for passively acquiring usage data relating to a personal computer.

As indicated above, the resident software passive communication listener 40 may advantageously be used in a metering system which meters a personal computer. An example of such a metering system is shown in FIG. 6 as a metering system 110. The metering system 110 includes a passive communication listener 112, which may be in the form of the resident software passive communication listener 40 and which acquires usage data from a personal computer 114. This usage data is transferred by the passive communication listener 112 to a data storage and communication module 116. (The data storage and communication module 116 may also acquire television program ratings data.) The data storage and communication module 116 stores the usage data from the passive communication listener 112 and also stores identification and verification information from a user identification and verification module 118. Immediately or periodically, the data storage and communication module 116 communicates the user identification and verification information from the user identification and verification module 118 and the usage data from the passive communication listener 112 over a communication medium 120 to a data processor 122 which may be located at a central facility.

The data storage and communication module 116 may be similar to the data storage and communication module 30, the user identification and verification module 118 may be similar to the user identification and verification module 32, the communication medium 120 may be similar to the communication medium 36, and the data processing module 122 may be similar to the data processing module 34.

Figure 7:
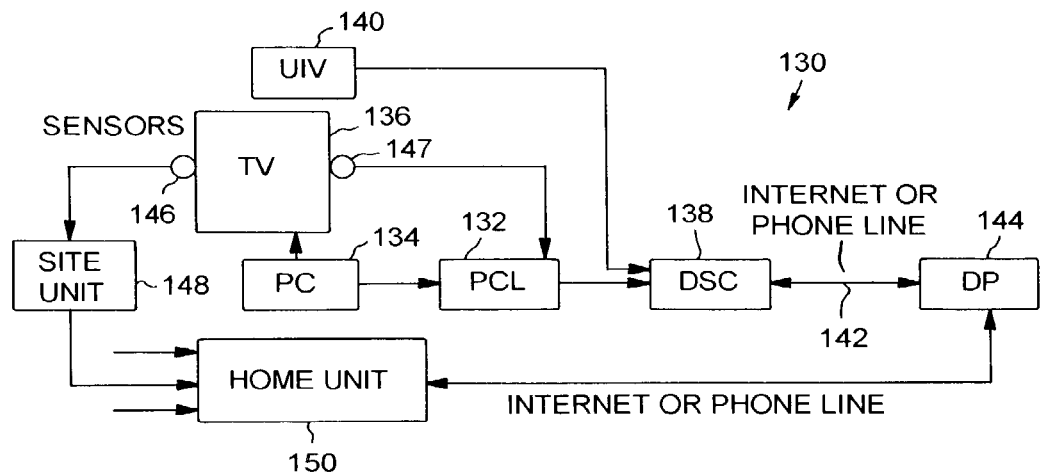
FIG. 7 is a block diagram of a metering system according to the present invention having a passive communication listener for passively acquiring usage data relating to a personal computer that shares a monitor with a television.

As shown in FIG. 7, a metering system 130 may be arranged to meter a personal computer which shares a monitor with a television. The metering system 130 includes a passive communication listener 132 which is arranged to accumulate usage data from a personal computer 134 that shares a monitor with a television 136. As in the case of the passive communication listener 112, the passive control listener 132 may be software similar to the program shown in FIGS. 4 and/or 5 and may be resident on the personal computer 134. Accordingly, the passive communication listener 132 accumulates usage data and transfers the usage data to a data storage and communication module 138. The data storage and communication module 138 stores the usage data and also stores user identification and verification information supplied by a user identification and verification module 140. The data storage and communication module 138 communicates the usage data from the passive communication listener 132 and the user identification and verification information from the user identification and verification module 140 over a communication medium 142 to a data processing module 144.

The metering system 130 shown in FIG. 7 may also be used to accumulate television program ratings data. Accordingly, non-intrusive sensors 146 may be located adjacent to a cabinet of the television 136. Alternatively, or in addition to the non-intrusive sensors 146, a non-intrusive sensor 147 may be located adjacent to a cabinet of the television 136. The non-intrusive sensors 146 may sense the video and/or audio signals internal to the cabinet at a point where the video and/or audio signals are characteristic of the programs to which the television 136 is tuned. The sensed video and/or audio signals are supplied to a site unit 148 which acquires the television program ratings data from the video and/or audio signals sensed by the sensors 146. The non-intrusive sensors 146 and the site unit 148 may be similar to the apparatus which is located at the statistically selected household 12 disclosed in U.S. Pat. No. 5,481,294.

The non-intrusive sensor 147 may be an infrared sensor and may sense the infrared signals transmitted by a remote control to the television 136. The sensed remote control signals are supplied to the passive communication listener 132 (or alternatively to the site unit 148) which acquires television program ratings data from the remote control signals sensed by the non-intrusive sensor 147. The non-intrusive sensor 147 and the portion of the passive communication listener 132 (or alternatively the site unit 148) which respond thereto may be similar to the apparatus disclosed in U.S. Pat. No. 4,876,736 and/or in U.S. Pat. No. 4,972,503.

The television program ratings data acquired by the site unit 148 and/or by the passive communication listener 132 may include program identification codes embedded in the television video and/or audio signals, and/or may be signatures characterizing the TV video and/or audio signals relating to the programs tuned by the television 136.

The television program ratings data accumulated by the site unit 148 are transferred to a home unit 150 which may also receive television program ratings data from other site units 148 corresponding to other televisions located within the statistically selected end user facility in which the metering system 130 is located. Periodically, the home unit 150 supplies all of the accumulated television program ratings data to the data processing module 144.

The data processing module 144 generates usage reports based upon the usage data acquired by the passive communication listener 132 and by the other metering systems in other statistically selected end user facilities. Similarly, the data processing module 144 accumulates the television program ratings data from the home unit 150 of the metering system 130 and from the other home units of other metering systems located in other statistically selected end user facilities and generates television ratings reports therefrom.

The passive communication listeners 112 and 132 are of the type that are resident on a personal or other computer. Instead, a passive communication listener according to the present invention may be a box or other apparatus which is tapped into appropriate communication lines or cables that carry on-line communications to and from an interactive service device. Alternatively, a passive communication listener according to the present invention may be a box or other apparatus which acquires usage data from signals tapped by a probe non-intrusively coupled to an interactive service device such as an Internet television. This type of passive communication listener is particularly advantageous for those interactive service devices which do not have sufficient memory to store resident software passive communication listeners.

Figure 8:
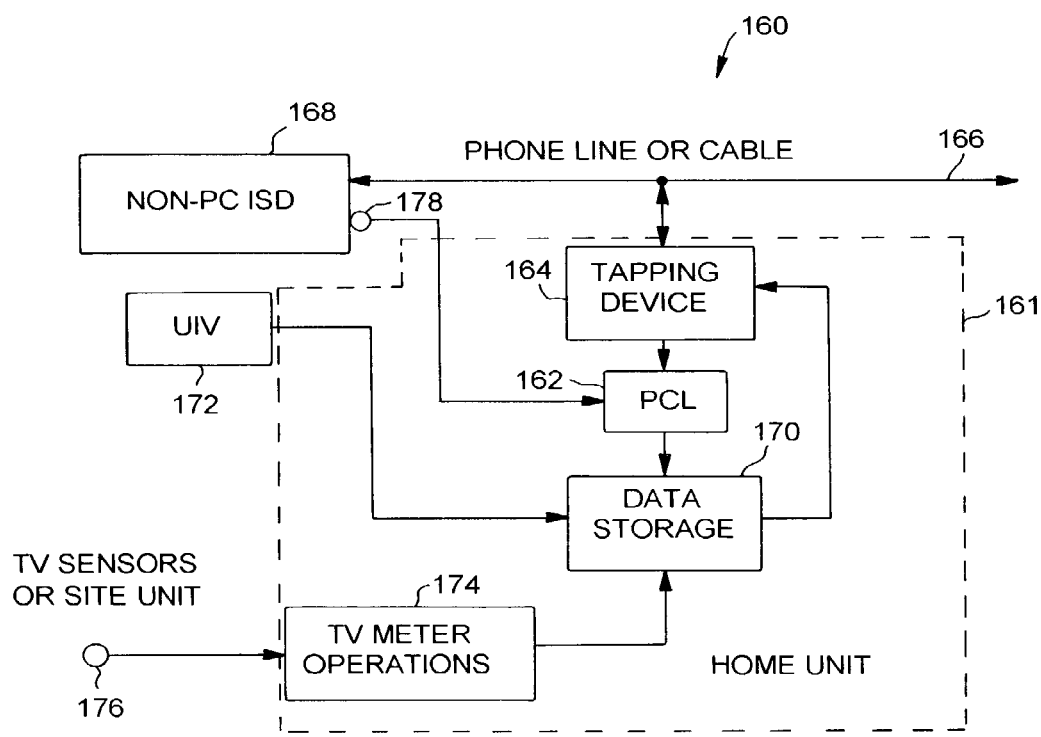
FIG. 8 is a block diagram of a metering system according to the present invention having a passive communication listener for passively acquiring usage data relating to a non-personal-computer interactive service device.

For example, a metering system 160 as illustrated in FIG. 8 includes a home unit 161 having a passive communication listener 162 which is coupled by way of a tapping device 164 to a communication medium 166 that may be a phone line or cable and that services a non-personal-computer interactive service device 168. The tapping device 144 may include a sensor similar to the sensor disclosed in U.S. Pat. No. 4,972,504 and may also include a modem for receiving and transmitting data on the communication medium 166. The passive communication listener 162 acquires on-line usage data based upon the communications over the communication medium 166 between the non-personal-computer interactive service device 168 and on-line service providers or web sites, and transfers the acquired on-line usage data to a data store 170. As described below, the passive communication listener 162 may also be arranged to acquire off-line usage data, and to transfer the acquired off-line usage data to the data store 170. The data store 170 stores the usage data from the passive communication listener 162, and also stores user identification and verification information supplied by a user identification and verification module 172. As in the case of FIG. 7, the data store 170 may also store television program ratings data from a television metering operations module 174 which receives video and/or audio signals from sensors 176. The data store 170 supplies its usage data, user identification and verification information, and television program ratings data to the modem of the tapping device 164 which transmits the usage data, the user identification and verification information, and the television program ratings data over the communication medium 166 to a central facility.

A non-intrusive sensor 178 may be located adjacent to the non-personal-computer interactive service device 168 and may be an infrared sensor which senses the infrared signals transmitted by a remote control to the non-personal-computer interactive service device 168. The sensed remote control signals are supplied to the passive communication listener 162 which acquires television program ratings data therefrom. The non-intrusive sensor 178, and the portion of the passive communication listener 162, which respond thereto may be as described above.

Figure 9:
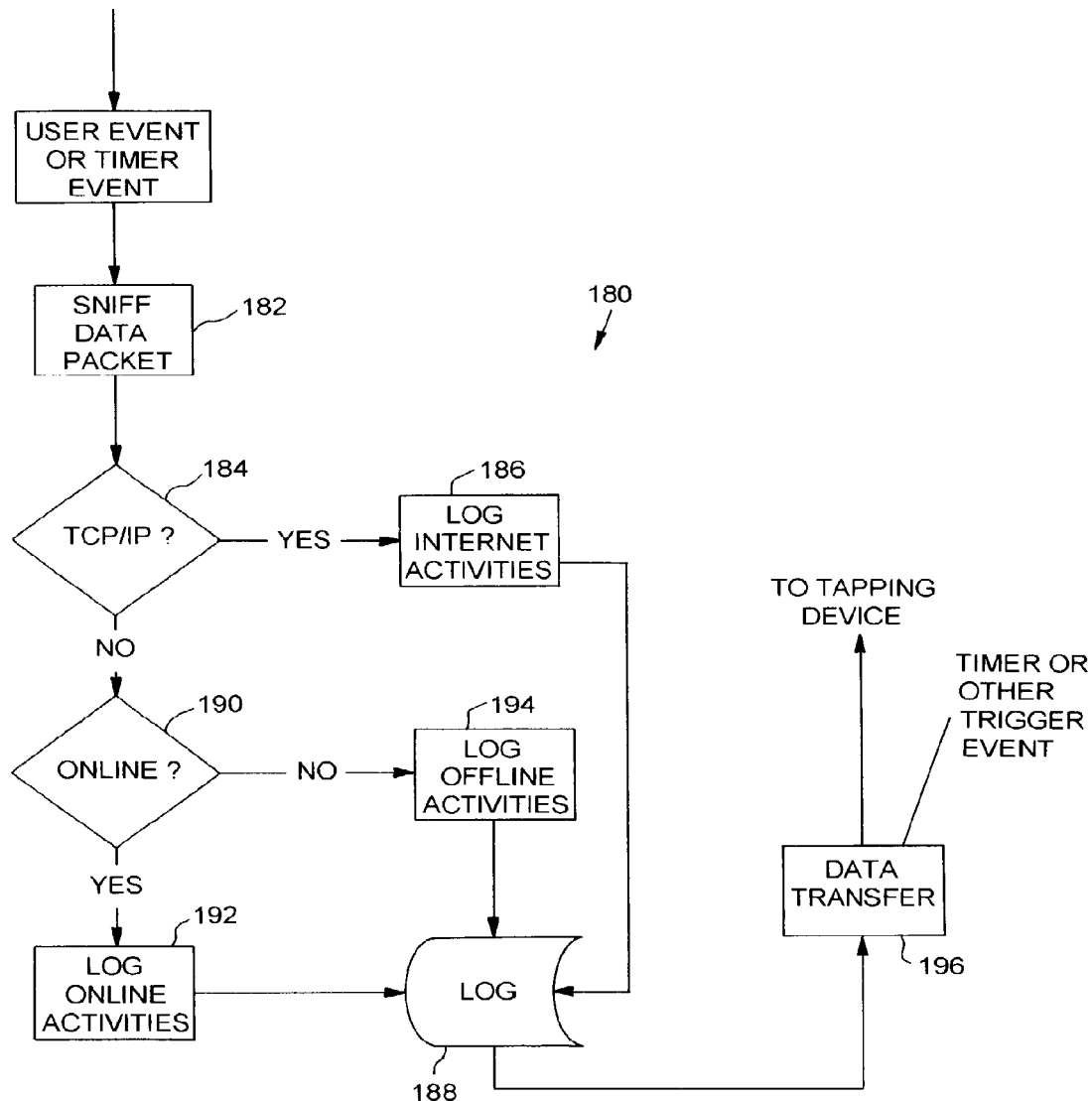
FIG. 9 is a flow chart representing one embodiment of the passive communication listener of FIG. 8.

The passive communication listener 162 may have a processor for executing a program 180, which is shown in FIG. 9, which may be arranged to meter both on-line and off-line usage, and which is an event driven program. Also, although the non-personal-computer interactive service device 168 may not have a hard drive, it may have sufficient internal memory to permit it to execute application programs. Such application programs, for example, can either be loaded from a floppy disk or can be downloaded to the non-personal-computer interactive service device 168 over the communication medium 166 from an on-line service provider or web site. Accordingly, the program 180 may be arranged to meter off-line usage in addition to on-line usage.

It should be noted, however, that the passive communication listener 162 relies on the tapping device 164 to tap into on-line service communications in order to acquire on-line usage data. Such an arrangement is ill equipped to acquire off-line usage data. However, an off-line usage acquisition program may be temporarily loaded into a RAM or other temporary memory of the non-personal-computer interactive service device 168 either by the home unit 161 or by a remote facility. Alternatively, the off-line usage acquisition program may be more permanently loaded into an EEPROM or other read only memory of the non-personal-computer interactive service device 168. Accordingly, not only access to application programs may be metered, but also scrolling and other activity with respect to the execution of application programs may be metered.

The program 180 includes a block 182 which, upon the occurrence of a triggering user event or timer event, detects data packets being communicated on the communication medium 166 between the non-personal-computer interactive service device 168 and an on-line service provider or web site. For example, the block 182 may determine whether each data packet has a header indicating a communication to or from an on-line service provider or web site. A block 184 determines whether the detected data packet includes a header indicating a Transmission Control Protocol/Internet Protocol (TCP/IP). If so, a block 186 logs relevant data from the Internet data packet (such as relevant URLs and content) in a log file 188. This data may be similar to the data detected by the block 72.

If the detected data packet does not include a TCP/IP header, a block 190 determines whether the data packet relates to on-line activity other than Internet activity. If so, a block 192 logs relevant data from the non-Internet on-line activity in the log file 188. If the data packet does not relate to any on-line activity, a block 194 logs off-line activities in the log file 188. As taught above, the block 194 may be stored in temporary or permanent memory of the metered interactive service device. A block 196 immediately or periodically transfers the usage data logged in the log file 188 to the modem of the tapping device 144 for communication over the communication medium 166. After the block 186 logs relevant data from the Internet on-line activity in the log file 188, or after the block 192 logs relevant data from the non-Internet on-line activity in the log file 188, or after the block 194 logs off-line activities in the log file 188, the program 180 waits for the next event.

Figure 10:
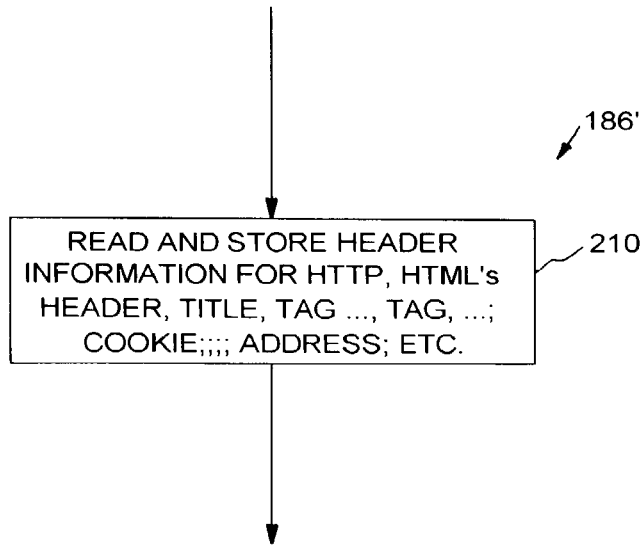
FIG. 10 is one embodiment of a more detailed representation of one of the blocks of FIG. 9.

A first embodiment of the block 186 is shown in FIG. 10. This first embodiment is a routine 186' which includes a block 200 that reads information related to Internet activities. For example, the block 200 reads the header information for the HTTP designation, reads the HTML's header, the title, tags, cookies, addresses, and so on that may be contained in an Internet communication on the communication medium 160. As shown in FIG. 9, this activity is logged in the log file 188. After the block 200 reads and stores information related to Internet activities, the program 180 waits for the next event.

A routine similar to the routine 186 can also be used for the block 192 shown in FIG. 9. In this case, however, the block 200 would be modified to read and store relevant data from headers in data packets transmitted to and received from other on-line service providers or web sites. The block 194 may be similarly configured.

Figure 11:
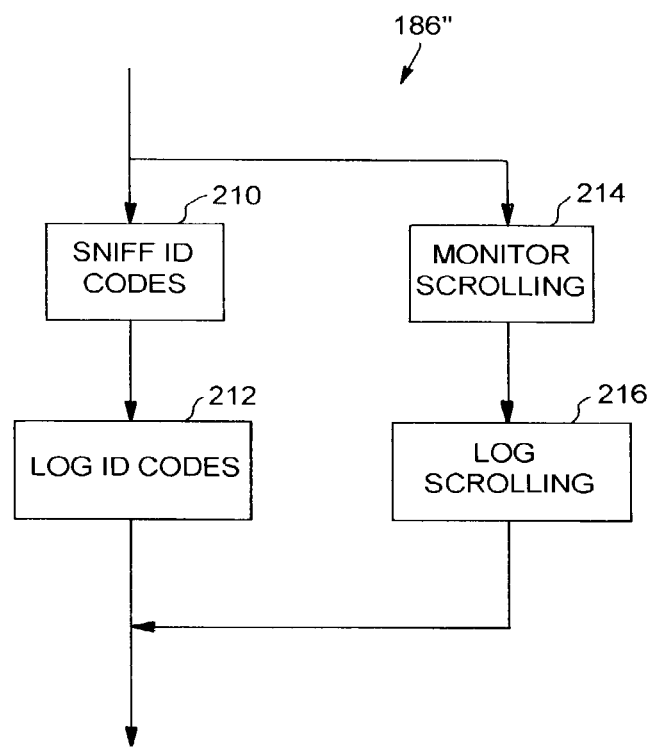
FIG. 11 is another embodiment of a more detailed representation of one of the blocks of FIG. 9.

A second embodiment of the block 186 is shown in FIG. 11 as a routine 186". The routine 186" includes a block 210 which detects any identification codes which may be embedded in the on-line communications between the non-personal-computer interactive service device 168 and an on-line service provider or web site over the communication medium 160. A block 212 logs the identification codes, and any other desired usage data, in a log file.

A block 214 monitors scrolling of the on-line service content in order to determine which portions of the delivered content are being displayed to the end user and how long each portion is in the active display of a monitor. Thus, the on-line service provider or web site of the content can make conclusions regarding the extent of end user interest in the content as a whole and also in specific portions of the content. This scrolling data is logged by a block 216 in a log file.

After the block 212 logs the identification codes, and any other desired usage data, in a log file, or after the block 216 logs the scrolling data in a log file, the program 180 waits for the next event.

Figure 12:
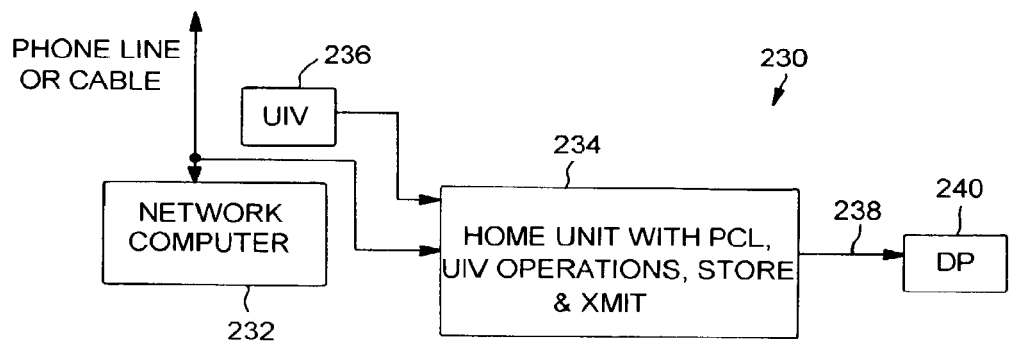
FIG. 12 is a block diagram of a metering system according to the present invention having a passive communication listener for passively acquiring usage data relating to a non-personal-computer interactive service device in the form of a network computer.

FIG. 12 illustrates a metering system 230 which is appropriate where the non-personal-computer interactive service device is a network computer 232. In this case, a home unit 234 may contain a passive communication listener similar to the passive communication listener 162, a tapping device similar to the tapping device 164, a data store similar to the data store 170, and (optionally) a television metering module and sensors similar to the television metering operations module 174 and the sensors 176. Accordingly, the home unit 234 acquires and stores user identification and verification information supplied by a user identification and verification module 236, usage data based upon on-line and off-line activities supported by the network computer 232, and television program ratings data if desired. The home unit 234 periodically or immediately transmits this user identification and verification information, usage data, and television program ratings data over a communication medium 238 to a data processing module 240 for report generation as described above.

Because the network computer 232 has little or no hard disk, the tapping approach shown in FIG. 8 may be used in order to acquire usage data regarding on-line and off-line activities. The passive communication listener of the home unit 234 may implement the program 180 described in connection with FIG. 9. That is, the passive communication listener of the home unit 234 may have a processor programmed in accordance with FIGS. 9-11. Also, because the network computer 232 has little or no hard disk, the block 194 may be stored in temporary memory of the metered network computer 232. Code implementing the functions of the block 194 may be loaded into such temporary memory of the metered network computer 232 by the passive communication listener of the home unit 234 or by an on-line service provider or web site. Alternatively, this code may be more permanently loaded into a EEPROM or other read only memory of the network computer 232.

Figure 13:
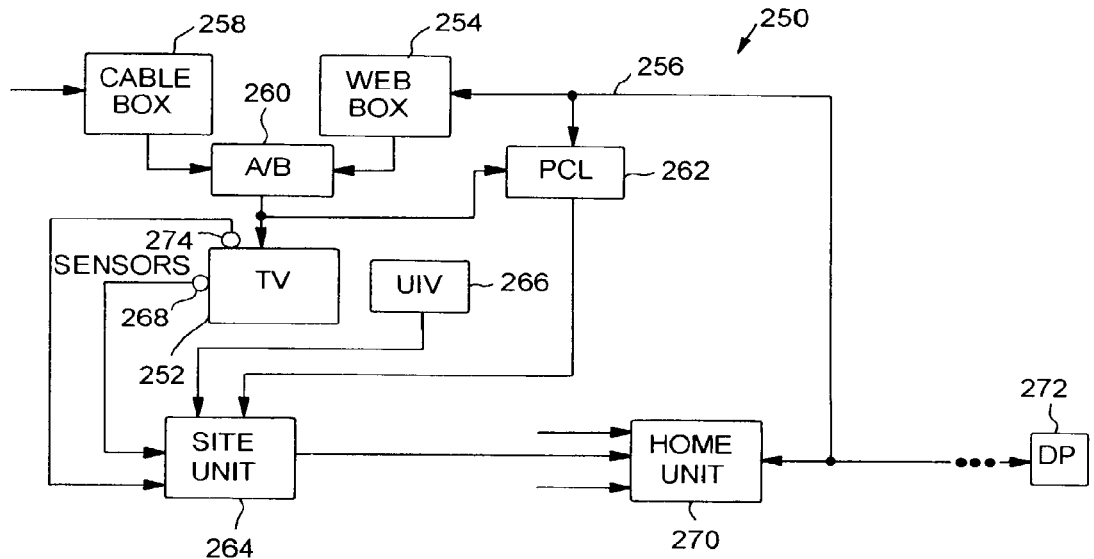
FIG. 13 is a block diagram of a metering system according to the present invention having a passive communication listener for passively acquiring usage data relating to an Internet television in the form of a television having an external web box.
Figure 14:
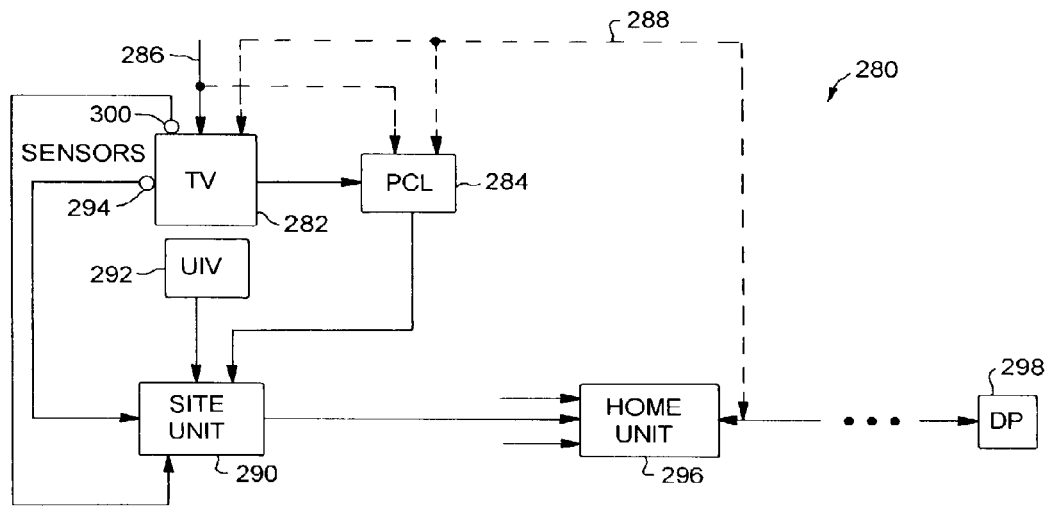
FIG. 14 is a block diagram of a metering system according to the present invention having a passive communication listener for passively acquiring usage data relating to an Internet television in the form of a web enabled television.
Figure 15:
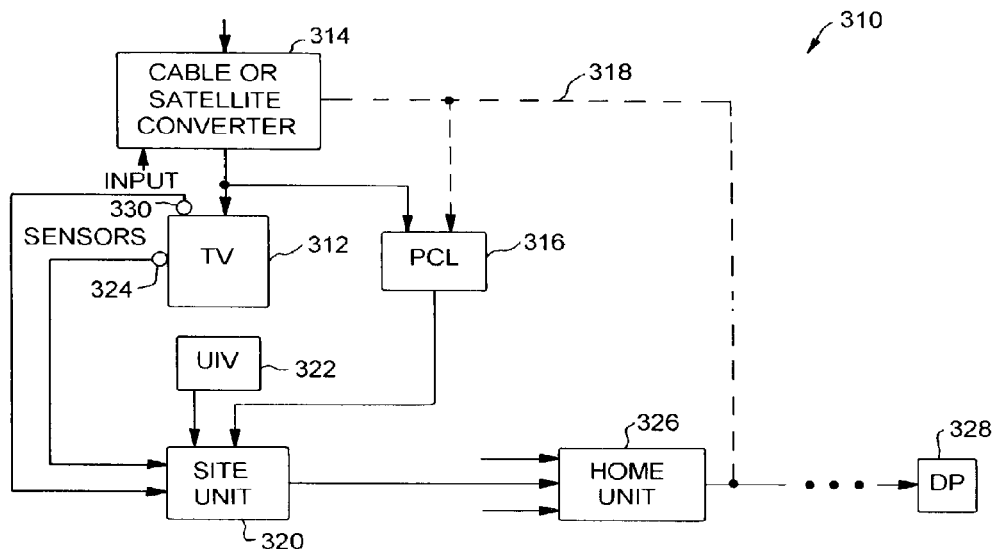
FIG. 15 is a block diagram of a metering system according to the present invention having a passive communication listener for passively acquiring usage data relating to an Internet television which receives on-line communications in a television video signal.

FIGS. 13-15 illustrate metering systems which may be used when the non-personal-computer interactive service device is an Internet television. In FIG. 13, a metering system 250 is particularly useful in the case where the Internet television includes a television 252 and a web box 254. The web box 254 transmits and receives on-line communications over a communication medium 256 and is arranged to control the television 252 so as to display the on-line communications to an end user. A cable box 258 receives television signals and is arranged to control the television 252 so as to display the television signals to an end user. An A/B switch 260 switches the television 252 between the web box 254 and the cable box 258.

A passive communication listener 262 is shown connected both to the communication medium 256 and to an output of the A/B switch 260. The passive communication listener 262 may include a CPU, a RAM, a ROM, and a modem. The passive communication listener 262 may also include a tapping device for tapping into the communication medium 256. Alternatively, as shown in FIG. 13, the passive communication listener 262 may include a tapping device for tapping into the output of the A/B switch 260. The tapping devices may be the same as, or similar to, those described above. Alternatively, the tapping device 164 may instead be a probe mounted on the cabinet of the television 252 in a position to pick up the video that is supplied to the CRT of the television 252. Such a probe is non-intrusive in the sense that opening of the cabinet of the television 252 is not necessary in order to mount the probe. This probe may be of the type disclosed in U.S. patent application Ser. No. 08/654,306 filed on May 28, 1996.

Accordingly, the passive communication listener 262 may be arranged to acquire appropriate usage data and to transfer that usage data to a site unit 264. The passive communication listener 262 may acquire usage data in a manner similar to that described above in connection with FIGS. 9-11 if the passive communication listener 262 is tapped into the communication medium 256. However, the passive communication listener 262 may acquire usage data in a manner similar to that described below in connection with FIG. 16 if the passive communication listener 262 is tapped into the output of the A/B switch 260.

Instead of tapping into either the communication medium 256 or the output of the A/B switch 260, the passive communication listener 262 may be tapped into both the communication medium 256 and the output of the A/B switch 260.

A user identification and verification module 266 acquires user identification and verification information and transfers that information to the site unit 264. The site unit 264 may also receive television video and/or audio signals from sensors 268 in order to derive television program ratings data therefrom as described above. The site unit 264 transfers the usage data, the user identification and verification information, and/or the television program ratings data to a home unit 270 which collects usage data, user identification and verification information, and/or television program ratings data from other metering systems metering other interactive service devices in the end user's facility and which then periodically transmits all such information and data to a data processor module 272. The data processor module 272, in turn, collects usage data, user identification and verification information, and/or television program ratings data from all other metering systems metering all other interactive service devices in all other statistically selected end user facilities in order to generate suitable reports.

The communications between the home unit 270 and the data processing module 272 may use the same communication medium 256 that supports the on-line communications to and from the web box 254. As in the other metering systems described above, the home unit 270 may transfer its information to the data processing module 272 during internet communications, by way of dedicated telephone calls to the data processing module 272, or the like.

A non-intrusive sensor 274 may be located adjacent to the television 252 and may be an infrared sensor which senses the infrared signals transmitted by a remote control to the television 252. The sensed remote control signals are supplied to the site unit 264 which acquires television program ratings data therefrom. The non-intrusive sensor 274, and the portion of the site unit 264, which respond thereto may be as described above.

The Internet television illustrated in FIG. 13 includes a television and a web box so that the television is, in effect, externally enabled to support on-line communications. As shown in FIG. 14, a metering system 280 may be used in the case where the television has internal web supporting components so that the television is internally enabled. This type of Internet television is referred to herein as a web enabled television and is shown in FIG. 14 as a web enabled television 282.

The metering system 280 includes a passive communication listener 284 which acquires on-line usage data supported by the web enabled television 282. The passive communication listener 284 may receive inputs from an appropriate output jack of the web enabled television 282. Preferably, although not necessarily, this output jack is a video output of the web enabled television 282. If the web enabled television 282 does not have an appropriate output jack for the passive communication listener 284, the passive communication listener 284 instead may be tapped, using the above-described tapping device, into a television signal and on-line communication input 286 of the web enabled television 282 and/or into a communication medium 288 (such as a phone line or cable) which supports on-line communications to and from the web enabled television 282.

The passive communication listener 284 may be similar to the passive communication listener 262 shown in FIG. 13. Accordingly, the passive communication listener 284 may acquire usage data in a manner similar to that described above in connection with FIG. 9, or the passive communication listener 284 may acquire usage data by executing a program, such as will be described in connection with FIG. 16, particularly where content from an on-line service provider or web site is transmitted in the vertical blanking intervals of television signals. The passive communication listener 282 transfers its usage data to a site unit 290 which also receives user identification and verification information from a user identification and verification module 292 and video and/or audio signals from sensors 294. This site unit 290 transfers to a home unit 296 the usage data from the passive communication listener 284, the user identification and verification information from the user identification and verification module 292, and television program ratings data based upon the video and/or audio signals from the sensors 294. The home unit 296 periodically communicates this data and information to a data processing module 298 over the communication medium 288.

A non-intrusive sensor 300 may be located adjacent to the television 282 and may be an infrared sensor which senses the infrared signals transmitted by a remote control to the television 282. The sensed remote control signals are supplied to the site unit 290 which acquires television program ratings data therefrom. The non-intrusive sensor 300, and the portion of the site unit 290, which respond thereto may be as described above.

FIG. 15 illustrates a metering system 310 which may be used in connection with an Internet television including a television 312 and a cable or satellite converter 314. The cable or satellite converter 314 converts received television signals for display by the television 312. The metering system 310 includes a passive communication listener 316 which may be coupled by a tapping device to a line between the television 312 and the cable or satellite converter 314 in order to receive the television signals coupled by the cable or satellite converter 314 to the television 312. In this case, on-line communications may be transmitted in the vertical blanking intervals of these television signals, and the passive communication listener 316 may acquire usage data by executing a program, such as will be described in connection with FIG. 16.

Alternatively, the passive communication listener 316 may be coupled by a tapping device to a communication medium 318 which is used in those cases where on-line communications of an on-line service provider or web site are supported by a medium other than a television signal medium received by the cable or satellite converter 314. In this case, the passive communication listener 316 may acquire usage data by executing the program shown in FIGS. 9-11.

The passive communication listener 312 acquires the appropriate usage data which it then transfers to a site unit 320. The site unit 320 also receives user identification and verification information from a user identification and verification module 322 and video and/or audio signals from sensors 324. The site unit 320 transfers to a home unit 326 the usage data from the passive communication listener 316, the user identification and verification information from the user identification and verification module 322, and television program ratings data based upon the video and/or audio signals from the sensors 324. The home unit 326 periodically transfers this data and information to a data processing module 328 over the communication medium 318.

A non-intrusive sensor 330 may be located adjacent to the television 312 and may be an infrared sensor which senses the infrared signals transmitted by a remote control to the television 312. The sensed remote control signals are supplied to the site unit 320 which acquires television program ratings data therefrom. The non-intrusive sensor 330, and the portion of the site unit 320, which respond thereto may be as described above.

Figure 16:
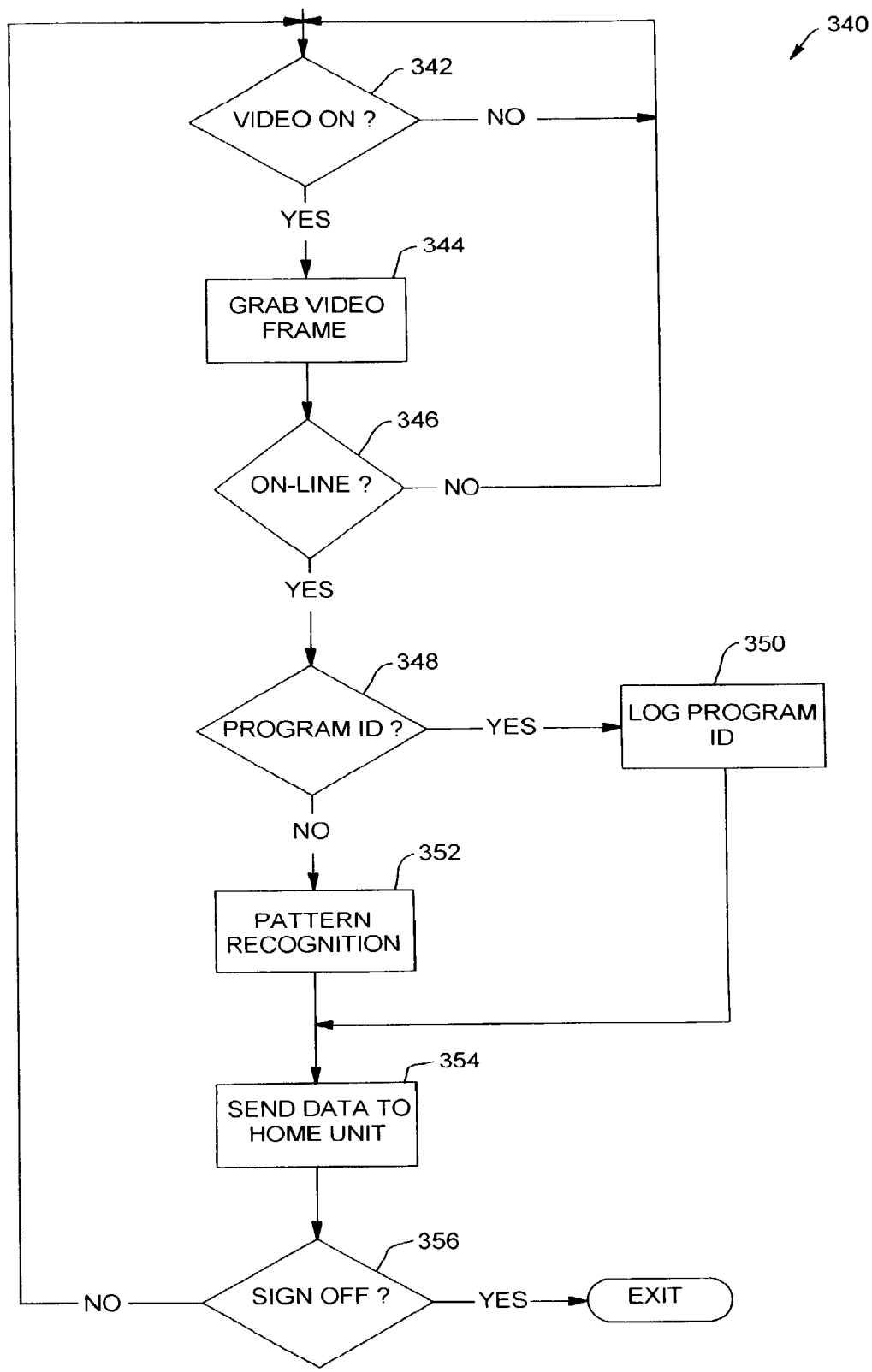
FIG. 16 is a flow chart representing a program which may be executed by a passive communication listeners in order to acquire usage data from content transmitted in television video signals; and, FIG. 17 is a block diagram illustrating a usage data collection system according to the present invention.

FIG. 16 illustrates a program 340 which may be executed by a passive communication listener in order to log usage data relating to on-line activity transmitted in video frames, such as in vertical blanking intervals of video frames. The program 340 may be resident on an interactive device in any manner described herein so as to acquire on-line usage data. The program 340 includes a block 342 which determines whether a video signal is being received. If a video signal is not being received, the block 342 continues to wait for the reception of a video signal. If a video signal is received, a block 344, which may be in the form of a frame grabber, grabs each video frame of the received video signal. These video frames may be in an NTSC format. A block 346 tests the grabbed video frame in order to determine whether the grabbed video frame contains a data packet having an on-line service header (such as an internet HTTP header). If not, program flow returns to the block 342.

If the grabbed video frame contains a data packet having an on-line service header, a block 348 determines whether an identification code is imbedded in the video frame grabbed by the block 344. In order to make this determination, the block 348 may use pattern matching. If the block 348 determines that an identification code is imbedded in the video frame grabbed by the block 344, a block 350 logs the identification code. If the block 348 determines that an identification code is not imbedded in the video frame grabbed by the block 344, a block 352 implements pattern recognition in order to derive other appropriate usage data related to the content of the on-line service data packets. That is, the block 352 causes the grabbed frame to be sampled in a predetermined manner and matches the pattern of the samples to a reference pattern previously extracted from samples of appropriate portions of the frame. Such an appropriate portion of a frame may include particularly relevant content.

After the block 350 logs an identification code, or after the block 352 implements pattern recognition, a block 354 causes the logged data to be transferred to a home unit. A block 356 then determines whether the end user has signed off any on-line activities. If not, program flow returns to the block 342. If so, the program 340 exits.

Figure 17:
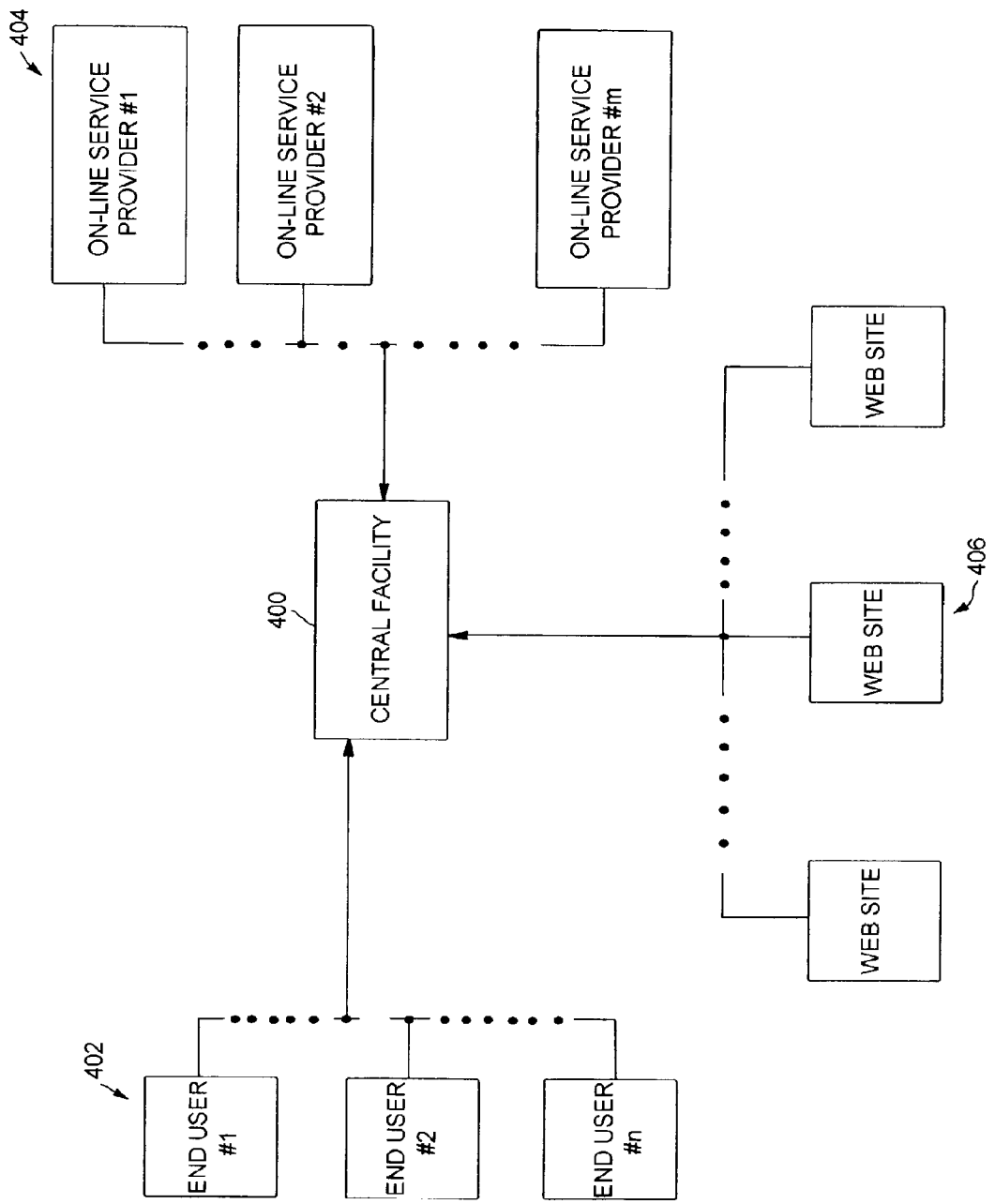

A collection system is shown in FIG. 17 and includes a central data collection facility 400 which may be a data processor such as those described above. The central data collection facility 400 collects usage data from a plurality of metering systems 402 located at the facilities of end users. These end users may employ the interactive service devices metered by the metering systems 402 in residences, commercial establishments such as businesses, governmental establishments, or the like. If the end user is at a business, the interactive service device being metered may be a proxy server that serves a local area network.

The facilities in which the metering systems 402 are located may be statistically selected in order to represent the entire population or a segment of the entire population relevant to usage of on-line and off-line services, depending on the intended scope of coverage of the reports which are generated on the basis of the collected usage data.

The usage data collected by the central data collection facility 400 from the metering systems 402 may include the identity of the on-line service providers or web sites accessed by end users, the number of times each on-line service provider or web site is accessed by end users, the amount of time spent at each service provider by end users, any identification codes embedded in the content delivered by on-line service providers or web sites, the identity of the applications programs executed by end users, the number of times each applications programs is executed by end users, the amount of time spent in executing each applications programs, inventories of application programs stored at an interactive service device, any identification codes embedded in the application programs executed by metered interactive service devices, scrolling of the content delivered by on-line service providers or web sites or of application programs executed by metered interactive service devices, the identity and other demographic information of the end users, and the like.

The central data collection facility 400 also collects usage data from a plurality of on-line service providers 404 located at the facilities which are remote from the end users 402. The usage data collected by the central data collection facility 400 from the on-line service providers 404 may include the number of times each on-line service provider is accessed by end users, the amount of time spent at each service provider by end users, the content provided by the on-line service providers, and the like. Data from the on-line service providers 404 may be necessary as a supplement in those cases where transmissions to end users are hard to decode, such as where the data is encrypted. However, it should be noted that identification and verification of end users is impractical when data is collected from the on-line service providers 404.

In addition, the central data collection facility 400 collects usage data from a plurality of web sites 406 located at the facilities which are remote from the end users 402 and the on-line service providers 404. The usage data collected by the central data collection facility 400 from the web sites 406 is easy to meter and may include the number of times each web site is accessed by an end user or an on-line service provider, the amount of time spent at each service provider by end users or on-line service providers, the content provided by the web site to the on-line service providers or web site, and the like. Again, data from the web sites 406 may be necessary as a supplement in those cases where transmissions to or from end users or on-line service providers are hard to decode, such as where the data is encrypted. However, it should be noted that identification and verification of end users is impractical when data is collected from the web sites 406.

Certain modifications of the present invention have been discussed above. Other modifications will occur to those practicing in the art of the present invention. For example, as described above, usage data is first stored and is then communicated to a remote facility, such as a central facility. Instead of storing the usage data before communicating it to a remote facility, however, the usage data can be communicated in real time, i.e. as soon as it is acquired. For example, the usage data acquirers of the present invention may be arranged to simply echo gets (requests transmitted by an interactive service device for on-line service from an on-line service provider) and receives (on-line service content transmitted by an on-line service provider in response to a request (i.e., a get) from an interactive service device) to a remote facility without storing the usage data. Thus, these usage data acquirers may be arranged to transmit copies of the gets and receives to the remote facility. For instance, the data acquirers may be arranged to remove the URL from a get just transmitted by an interactive service device to an on-line service provider, substitute the URL of the remote facility for the removed URL, and transmit the result as usage data. This data acquirer may also be arranged to copy a receive transmitted by an on-line service provider in response to a get previously sent by the metered interactive service device, remove the end user's URL from the copy, substitute the URL of the remote facility for the removed URL, and send the result as usage data.

Moreover, the metering systems shown in FIGS. 13-15 have been described above as acquiring usage data relating to on-line communications. If the Internet televisions are capable of executing application programs, the metering systems shown in FIGS. 13-15 may also be arranged to acquire usage data relating to off-line communications.

Furthermore, the passive communication listener 40 is described above as being an agent in a web browser or an insertable resident routine in a computer's operating system or in a web browser. Instead, the passive communication listener 40 may be resident on a hard drive or in RAM, and the passive communication listener 40 may be downloaded from a remote facility.

In addition, because a statistically selected end user facility may contain different interactive service devices, each such different interactive service device may be metered by a corresponding different one of the passive communication listeners described above.

Also, according to some aspects of the present invention, the usage data may be collected manually in written diaries or automatically on floppy disks, and the usage data may be transmitted to the central facility by mail, courier, or other delivery manual service. The particular manner in which the usage data is collected and transmitted depends upon the particular end users. For example, the interactive service devices of some end users may not have modems. Thus, instead of transmitting the usage data electronically, the usage data can be transmitted manually.

As described above, television program ratings data may be acquired by detecting identification codes in, and/or extracting signatures from, video and/or audio signals. Instead, television program ratings data may be acquired in more traditional manners such as employed in people meter systems, diaries, telephone surveys, and the like.

Accordingly, the description of the present invention is to be construed as illustrative only and is for the purpose of teaching those skilled in the art the best mode of carrying out the invention. The details may be varied substantially without departing from the spirit of the invention, and the exclusive use of all modifications which are within the scope of the appended claims is reserved.

What is claimed is:

1. A metering system comprising:
a data acquisition module to monitor communications of one or more computing devices without intercepting communications of the one or more computing devices, wherein the data acquisition module is to:
process the monitored communications to distinguish between communications associated with on-line activity of the one or more computing devices and communications associated with off-line activity of the one or more computing devices; and
meter data associated with the on-line activity and the off-line activity based on whether the monitored communications is associated with the on-line activity or the off-line activity.

2. A metering system as defined in claim 1, wherein the data comprises one or more of access data or usage data.

3. A metering system as defined in claim 1, wherein the data acquisition module is further to identify whether the communications associated with the on-line activity or the off-line activity are in use by each of the one or more computing devices.

4. A metering system as defined in claim 3, wherein the data acquisition module is further to identify whether the communications associated with the on-line activity or the off-line activity are in use by identifying different communication protocols.

5. A metering system as defined in claim 1, wherein the off-line activity is associated with use of one or more local application programs.

6. A metering system as defined in claim 5, wherein each of the local application programs is stored in at least one of the one or more computing devices.

7. A metering system as defined in claim 5, wherein the data acquisition module is further to identify the one or more local application programs and determine the extent of usage of the identified at least one local application program based on information from the communications associated with off-line activity.

8. A metering system as defined in claim 1 wherein the data acquisition module is further to process the monitored communications to determine an extent of usage of content associated with the monitored communications.

9. A metering system as defined in claim 1, wherein each of the one or more computing devices comprises an interactive service device.

10. A system as defined in claim 9, wherein each of the interactive service devices comprises one or more of a communication device, a network computer, an on-line service access device, a proxy server, or an Internet communication device.

11. A system as defined in claim 1, wherein the computing devices comprise at least two different types of computing devices.

12. A metering system as defined in claim 1 further comprising a user identification and verification module to identify one or more users of the one or more computing devices.

13. A metering system as defined in claim 1, wherein the monitored communications include communications between an operating system and one or more of a device driver or an application program of at least one of the one or more computing devices.

14. A metering system as defined in claim 13, wherein the communications between the operating system and the application program correspond to the off-line activity and the communications between the operating system and the device driver correspond to the on-line activity.

15. A metering system as defined in claim 1, wherein the monitored communications include data related to one or more of keyboard clicks, mouse clicks, touch-screen touches, remote control signals, remote keyboard signals, remote mouse signals, scrolling information, portions of delivered content, a time of display of content, program codes, program or content headings, vertical blanking intervals of video frames or identification information.

16. A metering system as defined in claim 1, wherein the data acquisition module is downloaded over a communication network to at least one of the one or more computing devices.

17. A metering system as defined in claim 1, wherein each of the one or more computing devices is in a respective statistically selected end user facility.

18. A metering system as defined in claim 1, wherein the on-line activity comprises activity related to use of an e-mail service.

19. A metering system as defined in claim 1, wherein the data acquisition module is an insertable resident routine within one or more of an operating system or a web browser.

20. A metering system as defined in claim 1, wherein the data acquisition module is to identify the monitored communications by reading one or more of header information, title information, a tag, a cookie, or an address.

21. A metering system as defined in claim 1, wherein the data acquisition module is tailored based on a type of the one or more computing devices.

22. A metering system as defined in claim 1, wherein the data acquisition module is further to identify television program usage data.

23. A metering system as defined in claim 1, wherein the data acquisition module is initialized based on the detection of an event.

24. A metering system as defined in claim 23, wherein the event indicates access to one or more of on-line service or an off-line service.

25. A metering system as defined in claim 23, wherein the event comprises one or more of modem activity or local area network activity.

26. A computer-implemented method of metering usage data comprising:
monitoring communications of one or more computing devices without intercepting communications of the one or more computing devices, wherein the communications are associated with on-line activity of one or more of the computing devices and with off-line activity of one or more of the computing devices;
processing, using a processor, monitored communications to distinguish between communications associated with the on-line activity and communications associated with the off-line activity; and
metering data associated with the on-line activity and the off-line activity based on whether monitored communications are associated with the on-line activity or the off-line activity.

27. A computer-implemented method as defined in claim 26 further comprising identifying via a processor whether the communications associated with the on-line activity or the off-line activity are in use by each of the one or more computing devices.

28. A computer-implemented method as defined in claim 27, wherein identifying whether the communications associated with the on-line activity or the off-line activity are in use comprises identifying different communication protocols.

29. A metering system as defined in claim 26, wherein the data comprises one or more of access data or usage data.

30. A computer-implemented method as defined in claim 26, wherein the off-line activity is associated with use of one or more local application programs.

31. A computer-implemented method as defined in claim 30, wherein each of the local application programs is stored in at least one of the one or more computing devices.

32. A computer-implemented method as defined in claim 30 further comprising identifying the one or more local application programs and determining an extent of usage of the identified at least one local application program based on information from the communications associated with the off-line activity.

33. A computer-implemented method as defined in claim 26 further comprising determining an extent of usage of content associated with the monitored communications.

34. A computer-implemented method as defined in claim 26, wherein each of the one or more computing devices comprises an interactive service device.

35. A computer-implemented method as defined in claim 26, wherein the computing devices comprise one or more of a communication device, a network computer, an on-line service access device, a proxy server, or an Internet communication device.

36. A computer-implemented method as defined in claim 26, wherein the computing devices comprise at least two different types of computing devices.

37. A computer-implemented method as defined in claim 26 further comprising identifying one or more users of the one or more computing devices.

38. A computer-implemented method as defined in claim 26, wherein the monitored communications include communications between an operating system and one or more of a device driver or an application program of at least one of the one or more computing devices.

39. A computer-implemented method as defined in claim 38, wherein the communications between the operating system and the application program correspond to the off-line activity and the communications between the operating system and the device driver correspond to the on-line activity.

40. A computer-implemented method as defined in claim 26, wherein the monitored communications include data related to one or more of keyboard clicks, mouse clicks, touch-screen touches, remote control signals, remote keyboard signals, remote mouse signals, scrolling information, portions of delivered content, a time of display of content, program codes, program or content headings, vertical blanking intervals of video frames or identification information.

41. A computer-implemented method as defined in claim 26 further comprising downloading a data acquisition module over a communication network to at least one of the one or more computing devices prior to monitoring the communications of the one or more computer devices.

42. A computer-implemented method as defined in claim 41, wherein the data acquisition module is an insertable resident routine within one or more of an operating system and a web browser.

43. A computer-implemented method as defined in claim 41, wherein the data acquisition module is tailored based on a type of the one or more computing devices.

44. A computer-implemented method as defined in claim 26, wherein each of the one or more computing devices is in a respective statistically selected end user facility.

45. A computer-implemented method as defined in claim 26, wherein the on-line activity comprises activity related to use of an e-mail service.

46. A computer-implemented method as defined in claim 26 further comprising identifying the monitored communications by reading one or more of header information, title information, a tag, a cookie, or an address.

47. A computer-implemented method as defined in claim 26 further comprising identifying television program usage data.

48. A computer-implemented method as defined in claim 26 further comprising initializing the monitoring of communications based on the detection of an event.

49. A computer-implemented method as defined in claim 48, wherein the event indicates access to one or more of an on-line service or an off-line service.

50. A computer-implemented method as defined in claim 48, wherein the event comprises one or more of modem activity or local area network activity.

51. A machine readable storage device or storage disc having instructions stored thereon that, when executed, cause a machine to:
monitor communications of one or more computing devices without intercepting communications of the one or more computing devices, wherein the communications are associated with on-line activity of one or more of the computing devices and with off-line activity of one or more of the computing devices;
process monitored communications to distinguish between communications associated with the on-line activity and communications associated with the off-line activity; and
meter data or associated with the on-line activity and the off-line activity based on whether monitored communications are associated with the on-line activity or the off-line activity.

52. A machine readable storage device or storage disc as defined in claim 51 having instructions stored thereon that, when executed, cause the machine to identify whether the communications associated with the on-line activity or the off-line activity are in use by each of the one or more computing devices.

53. A machine readable storage device or storage disc as defined in claim 52, wherein the machine identifies whether the communications associated with the on-line activity or the off-line activity are in use by identifying different communication protocols.

54. A machine readable storage device or storage disc as defined in claim 51, wherein the data comprises one or more of access data and usage data.

55. A machine readable storage device or storage disc as defined in claim 51, wherein the off-line activity is associated with use of one or more local application programs.

56. A machine readable storage device or storage disc as defined in claim 55, wherein each of the local application programs is stored in at least one of the one or more computing devices.

57. A machine readable storage device or storage disc as defined in claim 55 having instructions stored thereon that, when executed, cause the machine to identify the one or more local application programs and determine an extent of usage of the identified at least one local application program based on information from the communications associated with the off-line activity.

58. A machine readable storage device or storage disc as defined in claim 51 having instructions stored thereon that, when executed, cause a machine to determine an extent of usage of content associated with the monitored communications.

59. A machine readable storage device or storage disc as defined in claim 51, wherein each of the one or more computing devices comprises an interactive service device.

60. A machine readable storage device or storage disc as defined in claim 51, wherein the computing devices comprise one or more of a communication device, a network computer, an on-line service access device, a proxy server, or an Internet communication device.

61. A machine readable storage device or storage disc as defined in claim 51, wherein the computing devices comprise at least two different types of computing devices.

62. A machine readable storage device or storage disc as defined in claim 51 having instructions stored thereon that, when executed, cause the machine to identify one or more users of the one or more computing devices.

63. A machine readable storage device or storage disc as defined in claim 51, wherein the monitored communications include communications between an operating system and one or more of a device driver or an application program of at least one of the one or more computing devices.

64. A machine readable storage device or storage disc as defined in claim 63, wherein the communications between the operating system and the application program correspond to the off-line activity and the communications between the operating system and the device driver correspond to the on-line activity.

65. A machine readable storage device or storage disc as defined in claim 51, wherein the monitored communications include data related to one or more of keyboard clicks, mouse clicks, touch-screen touches, remote control signals, remote keyboard signals, remote mouse signals, scrolling information, portions of delivered content, a time of display of content, program codes, program or content headings, vertical blanking intervals of video frames or identification information.

66. A machine readable storage device or storage disc as defined in claim 51 having instructions stored thereon that, when executed, cause the machine to download a data acquisition module over a communication network to at least one of the one or more computing devices prior to monitoring the communications of the one or more computer devices.

67. A machine readable storage device or storage disc as defined in claim 66, wherein the data acquisition module is an insertable resident routine within one or more of an operating system or a web browser.

68. A machine readable storage device or storage disc as defined in claim 66, wherein the data acquisition module is tailored based on a type of the one or more computing devices.

69. A machine readable storage device or storage disc as defined in claim 51, wherein each of the one or more computing devices is in a respective statistically selected end user facility.

70. A machine readable storage device or storage disc as defined in claim 51, wherein the on-line activity comprises activity related to use of an e-mail service.

71. A machine readable storage device or storage disc as defined in claim 51 having instructions stored thereon that, when executed, cause the machine to identify the monitored communications by reading one or more of header information, title information, a tag, a cookie, or an address.

72. A machine readable storage device or storage disc as defined in claim 51 having instructions stored thereon that, when executed, cause the machine to identify television program usage data.

73. A machine readable storage device or storage disc as defined in claim 51 having instructions stored thereon that, when executed, cause the machine to initialize the monitoring of communications based on the detection of an event.

74. A machine readable storage device or storage disc as defined in claim 73, wherein the event indicates access to one or more of an on-line service or an off-line service.

75. A machine readable storage device or storage disc as defined in claim 73, wherein the event comprises one or more of modem activity or local area network activity.

* * * * *